April 12, 1949.                R. B. HEARN ET AL                2,466,891
                         UNIVERSAL TELEGRAPH REPEATER
Filed July 4, 1945                                          8 Sheets-Sheet 1

FIG. I

INVENTORS  R. B. HEARN
           C. B. SUTLIFF
BY
           John E. Cassidy
                    ATTORNEY April 12, 1949.  R. B. HEARN ET AL  2,466,891
UNIVERSAL TELEGRAPH REPEATER Filed July 4, 1945  8 Sheets-Sheet 3

INVENTORS R. B. HEARN
C. B. SUTLIFF
BY John E. Cassidy
ATTORNEY

April 12, 1949.   R. B. HEARN ET AL   2,466,891
UNIVERSAL TELEGRAPH REPEATER

Filed July 4, 1945   8 Sheets-Sheet 4

INVENTORS
R.B. HEARN
C.B. SUTLIFF
BY John E. Cassidy
ATTORNEY

April 12, 1949.    R. B. HEARN ET AL    2,466,891
UNIVERSAL TELEGRAPH REPEATER
Filed July 4, 1945    8 Sheets-Sheet 5
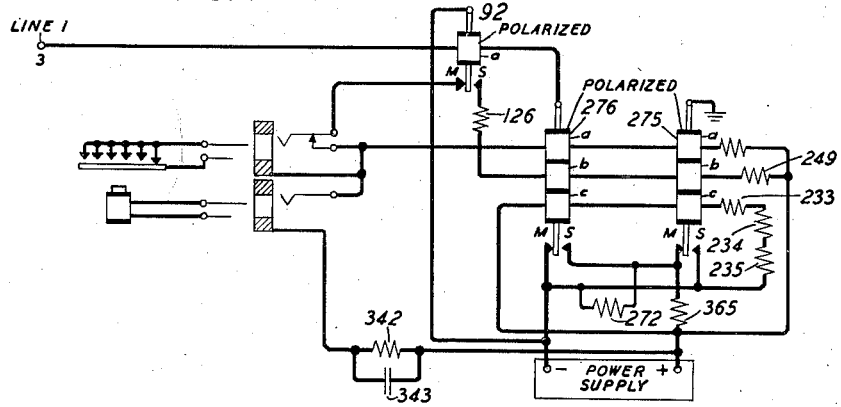
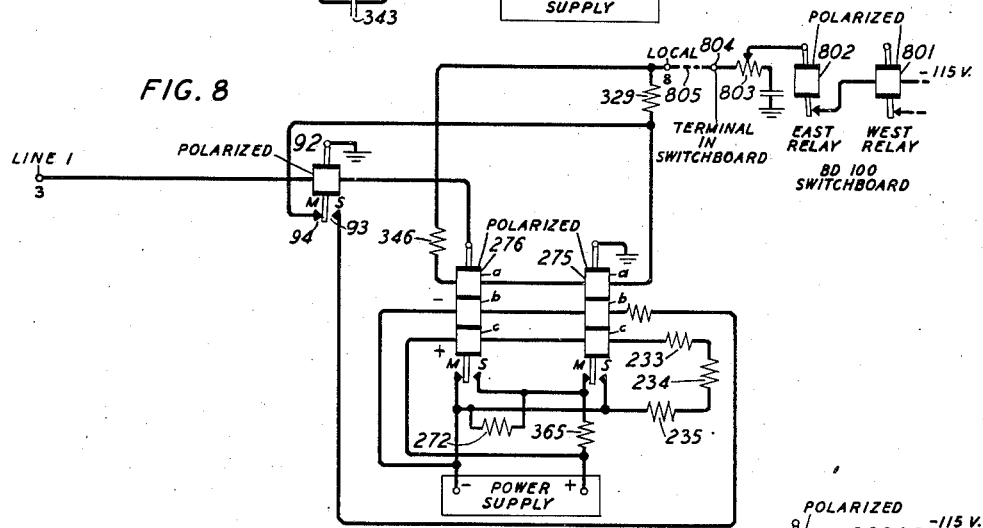
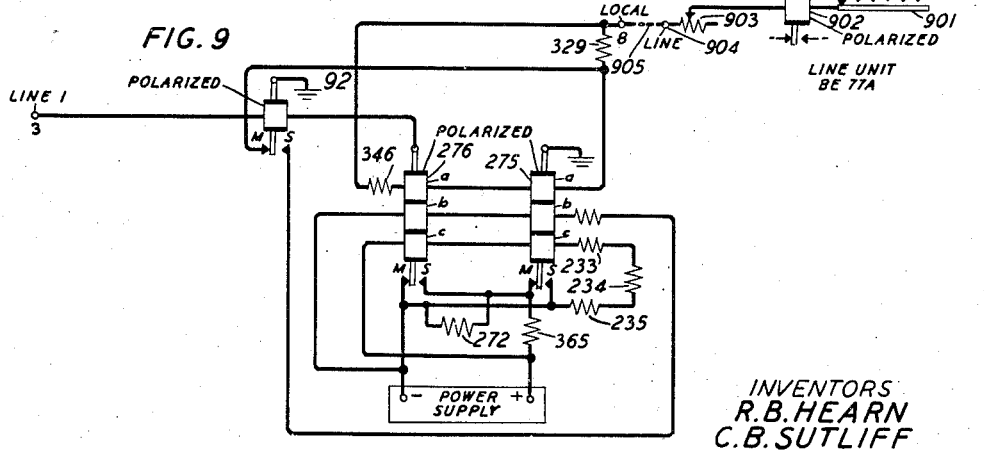
INVENTORS
R.B. HEARN
C.B. SUTLIFF
BY John E. Cassidy
ATTORNEY April 12, 1949.　　　R. B. HEARN ET AL　　　2,466,891
UNIVERSAL TELEGRAPH REPEATER Filed July 4, 1945　　　　　　　　　　　　　8 Sheets-Sheet 6

INVENTORS
R. B. HEARN
C. B. SUTLIFF
BY John E. Cassidy
ATTORNEY

April 12, 1949.  R. B. HEARN ET AL  2,466,891
UNIVERSAL TELEGRAPH REPEATER
Filed July 4, 1945  8 Sheets-Sheet 7

INVENTORS R. B. HEARN
BY C. B. SUTLIFF
John E. Cassidy
ATTORNEY

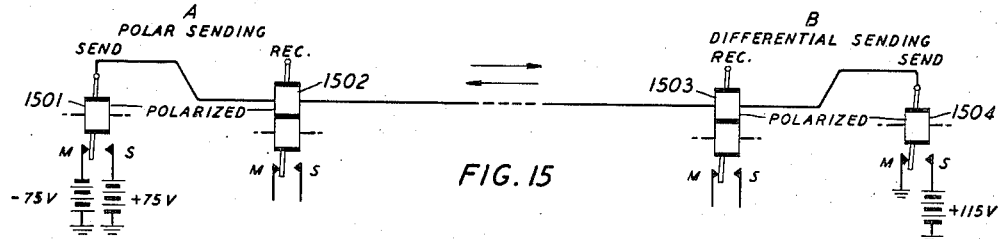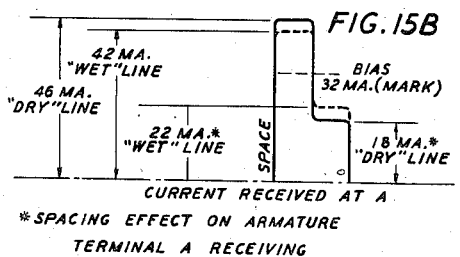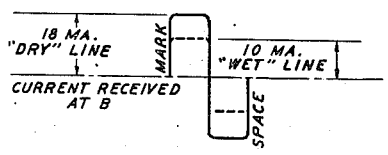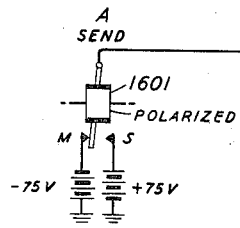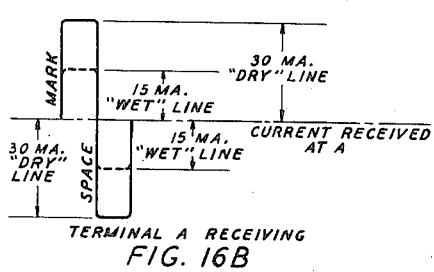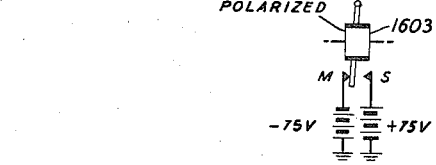

Patented Apr. 12, 1949

2,466,891

UNITED STATES PATENT OFFICE 2,466,891

UNIVERSAL TELEGRAPH REPEATER

Richard B. Hearn, Hollis, N. Y., and Carleton B. Sutliff, East Orange, N. J., assignors to Bell Telephone Laboratories, Incorporated, New York, N. Y., a corporation of New York Application July 4, 1945, Serial No. 603,208

20 Claims. (Cl. 178—70)

This invention relates to telegraph repeaters and particularly to an improved repeater for quickly furnishing service at a terminal or at an intermediate point under a wide variety of conditions such as may be encountered in military service.

An object of this invention is the improvement of telegraph repeater systems. A more particular object of the invention is the provision of a repeater which is adaptable to a wide variety of service conditions with a minimum of adjustment. Another object of the invention is the provision of a repeater which will function on a longer span or on a line of higher capacity than any heretofore devised without "kick off" of the repeater relay.

The repeater herein is designed to be controlled by manually operable switches on its line side and on its local side so that it can be instantly connected to function in a number of different manners and with a number of different connecting facilities at different times to meet different field conditions.

The repeater herein is designed to provide satisfactory service over simplexed field wire over a span of seventy-five miles when connected to such a repeater as is disclosed in R. B. Hearn, C. B. Sutliff Patent 2,422,677, issued June 24, 1947.

When two repeaters such as are disclosed herein are connected together back to back and operating over simplexed field wire, the system will provide satisfactory service over two forty-mile spans.

The repeater herein is arranged to perform the following functions.

1. It will operate as a type B polar sending polarential repeater to a simplexed field wire line or to a composited open wire line;
2. It will operate as a type B polar receiving repeater on simplexed field wire lines or composited open wire lines;
3. It will operate as a two-path polar repeater on field telegraph circuits;
4. It may be terminated directly in a printer;
5. It may be terminated in a switchboard;
6. It may be terminated in a carrier terminal;
7. Two repeaters such as are disclosed herein may be directly interconnected for operation as a through type repeater with provision for connecting to a printer at the through point;
8. It may be connected to an electronic regenerative repeater such as is disclosed in copending application, Serial No. 556,352, R. B. Hearn, J. A. Krecek, filed September 29, 1944.

GENERAL PRELIMINARY DESCRIPTION

The repeater herein is designated to facilitate rapid installation and line up for service. This is especially desirable when the repeater is used for military service in the field. To promote rapid installation and line up, the adjustable features have been reduced to a minimum. This is achieved in part through the provision of means which insure satisfactory operation over a relatively wide range without the necessity for adjustment.

The transmission system may be either type B polarential or two-path polar. Type B polarential operation is described in W. W. Cramer Patent 2,131,870, October 4, 1938, and more particularly in the drawing per Fig. 2 thereof and the associated description; also in Smith Patent 2,136,984, November 15, 1938. Two-path polar operation may be understood from a reference to Patent 2,211,176, F. J. Singer, August 13, 1940, and more particularly to the lines interconnecting the stations in Fig. 1 thereof and the associated description. Both of these portions of these patents are made part of this disclosure as though fully set forth herein. In general, the term "Polarential" will be used hereinafter as signifying "type B polarential."

When the repeater herein is arranged for type B polarential operation, polar sending, the transmission from the polar sending end is polar, that is, the marking signal and spacing signal conditions are effected through reversals of polarity of voltages of equal magnitudes. Positive and negative 75 volts have been found desirable for use in this particular embodiment. Negative 75-volt potential is applied to the line for marking and positive 75 volts for spacing. The operation in the opposite direction is differential. Ground is connected to the line for marking and in this embodiment positive 115 volts are applied for spacing. In this particular embodiment the circuit is adjusted to obtain an 18-milliampere line curent during the marking period when signaling in either direction. When transmitting from the polar sending end, the line current, during the spacing interval, is of like magnitude but reversed in direction. When transmitting from the differential sending end, the line current for the spacing interval is in the same direction as that for the marking interval but the line current is increased. In this particular embodiment it is increased to approximately 46 milliamperes.

FEATURES OF THE INVENTION

One of the important features of the invention herein is the line switching arrangement. The line switching is performed by a line switch. The line switch is connected between the repeater and the line. It is arranged so that it may be actuated to three different positions depending upon the type of service which the repeater is to provide, as follows:

1. When the line switch is in position 1, the repeater herein is arranged to function as the polar sending end of a type B polarential repeater;

2. When the line switch is in position 2, the repeater herein is arranged to function as the polar receiving end of a type B polarential repeater;

3. When the line switch is in position 3, the repeater herein is arranged to function as a two-path polar repeater.

Another important feature of the invention herein is the local switching arrangement. The local switching is performed by a local switch. The local switch is provided for conditioning the local side of the repeater for connection to the circuits with which the repeater herein is required to operate. The local switch may be actuated to five different positions to provide five different connections for the local side of the repeater, as follows:

1. When the local switch is in position 1, the local side of the repeater herein is arranged for termination in a printer;

2. When the local switch is in position 2, the local side of the repeater herein is arranged for termination in any one of three different facilities as follows: 1, a line circuit of a switchboard; 2, a line unit comprising a line relay which is a receiving relay and the sending contacts of a printer; 3, a printer station;

3. When the local switch is in position 3, the repeater herein is arranged for termination in the local side of a carrier terminal;

4. When the local switch is in position 4, the repeater herein is arranged for service as the first half of an intermediate repeater. A second repeater such as the repeater herein is required to function as the second half of the intermediate repeater;

5. When the local switch is in position 5, the repeater herein is arranged for service as the second half of an intermediate repeater. The repeater herein may then cooperate with a second repeater, such as the repeater herein, having its local switch actuated to its position 4.

When the local switch is in position 5, the repeater herein, instead of being connected to another repeater such as the repeater herein, may be connected instead to an electronic regenerative repeater disclosed in the copending application, Serial No. 556,352, R. B. Hearn, J. A. Krecek, filed September 29, 1944.

A third important feature of the invention herein is an oscillator circuit which provides 1000-cycle tone for use when the system is operated by manual Morse operation. The oscillator consists of a neon lamp, a condenser, a variable resistance and a fixed resistance. A jack is provided for patching a receiver to the oscillator circuit. When the receiver is not connected to the jack, contacts on the jack disconnect the oscillator circuit. A telegraph key is provided for manual sending.

Another important feature of the invention herein is the combination of a special power supply circuit with the repeater equipment. In the present embodiment a rectifier in the power supply circuit rectifies 115 or 230 volts, 50- to 60-cycle power, to direct current power. An autotransformer is included in the power supply circuit to reduce the voltage to 115 volts for the operation of the printer when the primary source is 230 volts. A 115-volt-230-volt switch is included in the power unit to switch the internal connection for 115 volts or 230 volts as required. A gang switch is provided external to the power unit for making the proper connection when the power source is 115 volts direct current or 115 volts or 230 volts alternating current. Two fuses, one in the power unit and one external to the power unit, protect the primary side of the power unit. Two other fuses external to the power unit protect the secondary side of the power unit. Two switches are provided for adjusting the output voltage from the power unit. One of these voltage adjustment switches is for changing the voltage in coarse steps and the other for fine steps. The repeater is equipped with a socket to facilitate connection of the power supply to the printer.

A further feature of the invention herein is a special arrangement of switching for adjusting the line current and capacity.

A switch for adjusting the line current in coarse steps is provided for maintaining an approximate adjustment of the line current. This switch also performs the function of connecting capacity across line current regulating resistances, thus providing low terminating impedance for the repeater. A continuously variable resistance for adjusting the line current is provided to obtain an accurate adjustment of line current. The adjustment which can be obtained with the variable resistance is limited, so that the switch for adjusting the line current in coarse steps must be used to obtain the full range of permissible adjustment.

A further feature of the invention is an improved anti-kick off arrangement for preventing the receiving relay from kicking off when the repeater herein transmits into a line of high capacity. A number of anti-kick off arrangements are known in the art but none of the presently known arrangements is suitable for application in the present repeater. This is attributable in part to the fact that the capacities of the lines on which the present repeater is designed to function are greater than the capacities of lines for which the presently known anti-kick off arrangements are intended to function. The anti-kick off feature comprises a two-unit varistor and a condenser, and the specially arranged manner of connection of these units to the receiving relay so as to prevent kick-off of the relay due to the inordinately heavy current surges from the lines on which the repeater will function especially in military service.

The foregoing and other features will become apparent from the following description when read with reference to the drawings herein showing a preferred embodiment of the invention, in which:

Fig. 1 is the left-hand portion and Fig. 2 the right-hand portion of a circuit schematic showing the combined repeater of the invention, which combined repeater can be controlled through the operation of the line switch to provide three different optional arrangements of the internal connections of the line side of the repeater to operate in three different manners and through the operation of the local switch to provide five different optional arrangements of internal connections of the local side of the repeater to operate with eight different external facilities, all of which optional arrangements are separately shown on other drawing figures herein for convenience;

Fig. 7 is a simplified schematic showing the local side of the repeater per Figs. 1 and 2 operating with a printer;

Fig. 8 is a simplified schematic showing the local side of the repeater per Figs. 1 and 2 operating with a switchboard;

Fig. 9 is a simplified schematic showing the local side of the repeater per Figs. 1 and 2 operating with a line unit;

Fig. 15 is a simplified schematic showing both ends of a circuit arranged for type B polarential operation. It is used in explaining the type B polarential operation;

Fig. 15A is an explanatory diagram showing the signal current received at the differential end from signals transmitted from the polar transmitting end of a type B polarential circuit;

Fig. 15B is an explanatory diagram showing the signal current received at the polar end from signals transmitted from the differential sending end of a type B polarential circuit;

Fig. 16 is a simplifier schematic showing the two channels of a circuit arranged for two-path polar operation;

Fig. 16A is an explanatory diagram showing the signal current received at one terminal of a two-path polar circuit; and Fig. 16B is an explanatory diagram showing the signal current received at the second terminal of a two-path polar circuit.

Figure 1:
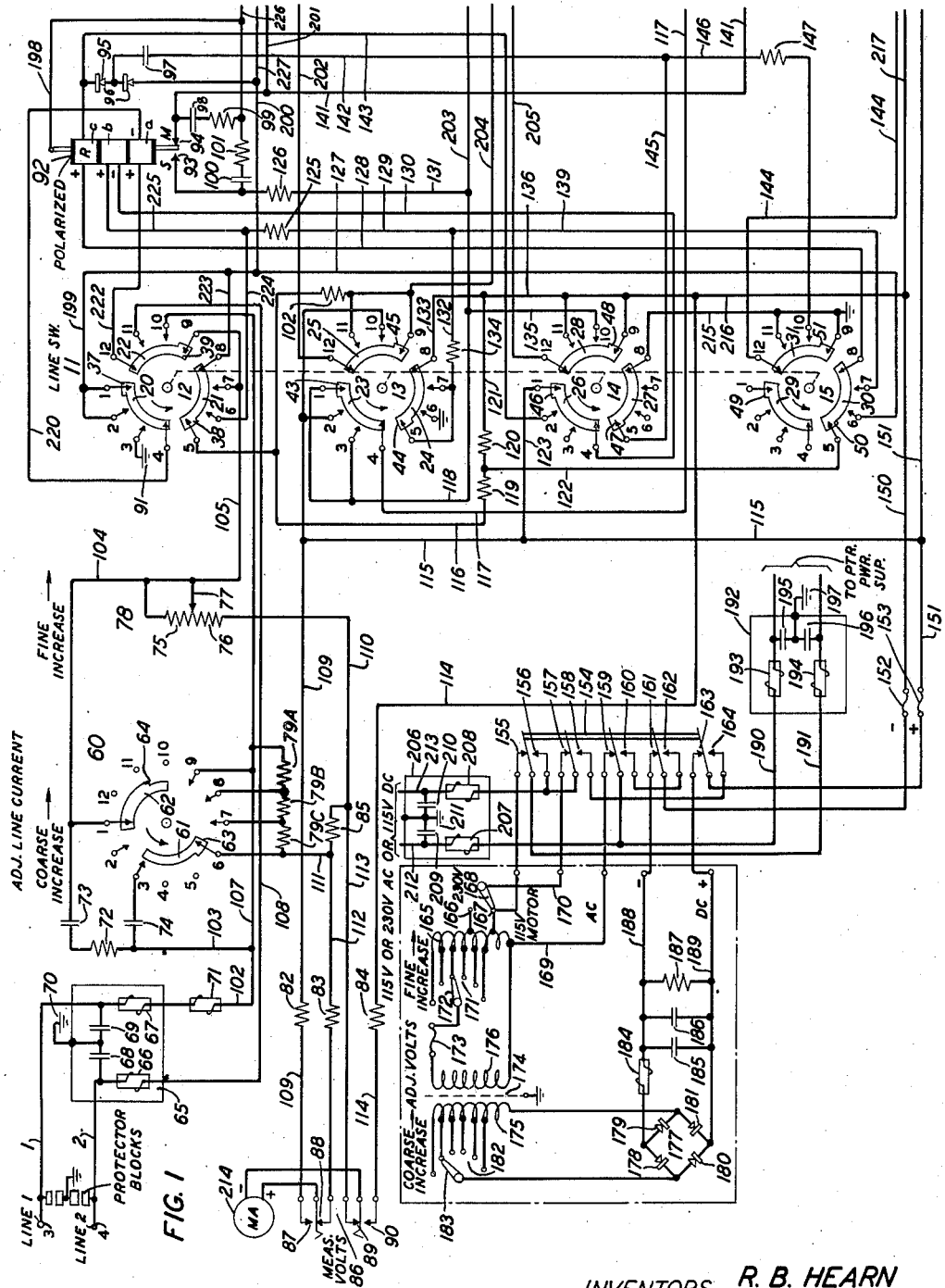
Figure 2:
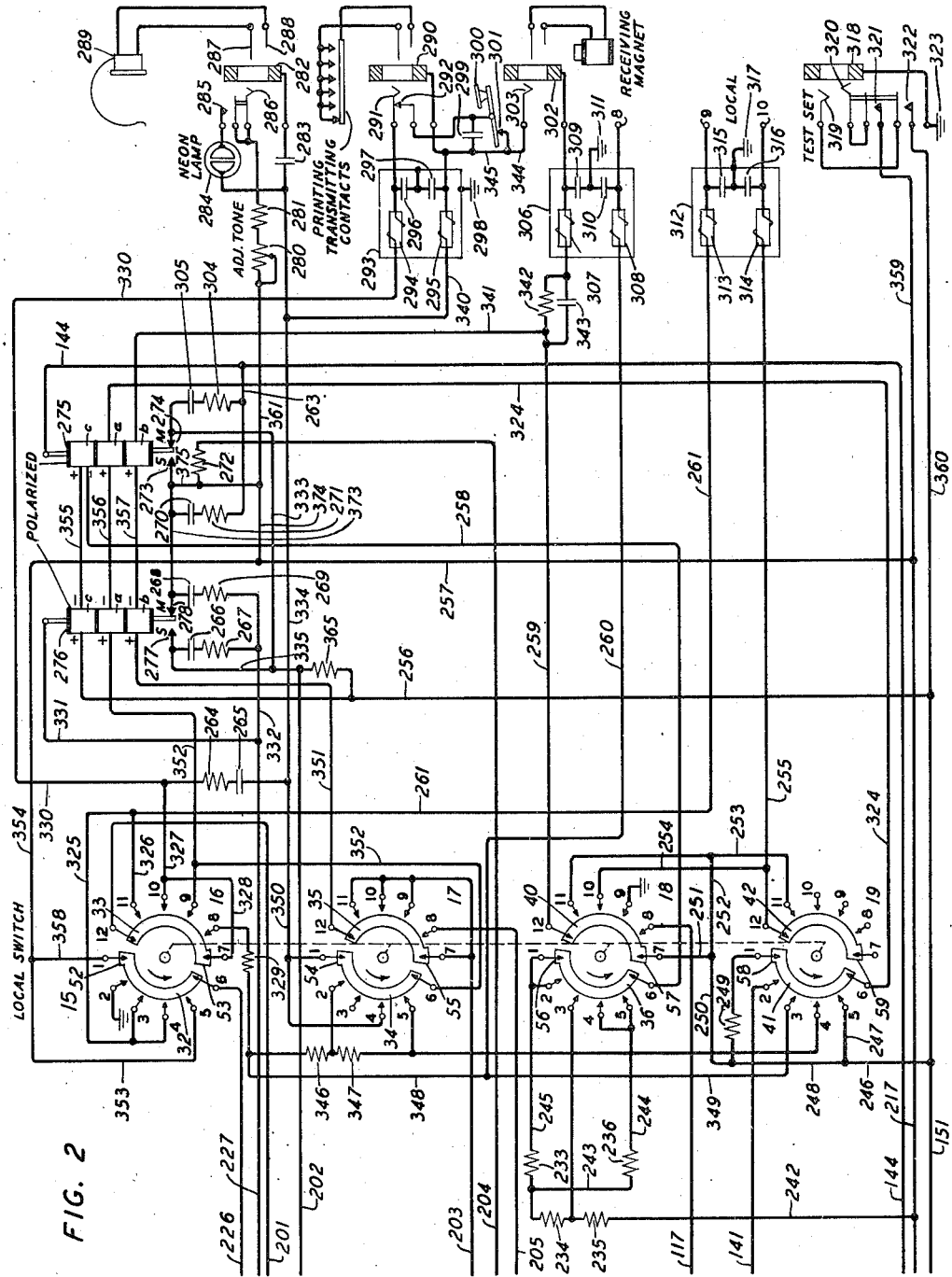

Refer now to the drawings Figs. 1 and 2.

Before proceeding with a detailed description of the operation of the circuit certain preliminary matters will first be described.

Conductors extending to the right-hand margin of Fig. 1 connect to conductors in corresponding positions extending to the left-hand margin of Fig. 2.

At the upper left of the drawing, Fig. 1, two lines, 1 and 2, are shown connected to two terminals, 3 and 4, respectively. Line 1 is used for sending and receiving when the repeater is in condition for polar sending or polar receiving polarential operation. Line 1 is used also as the sending line in two-path polar operation. Line 2 is used only in two-path polar operation and serves as the receiving line in such operation.

Terminals 8, 9 and 10, respectively, at the lower right of Fig. 2, are used in establishing connections on the local side of the repeater.

The various line and local options are obtained by manually adjusting line switch 11 and local switch 15. The manually operable line switch 11 comprises four separate unit switches 12, 13, 14 and 15. The manually operable local switch 15 comprises four separate unit switches 16, 17, 18 and 19. Switches 11 and 15 are shown in their first positions which are the extreme clockwise positions for each switch. When either the line switch 11 or the local switch 15 is actuated, all of the unit switches associated with the particular switch are operated in unison as each unit switch is rigidly attached to the same single rotatable shaft on the particular switch. That is to say, when switch 11 is operated, for instance, by turning its rotatable shaft in a counter-clockwise direction, as indicated by the arrows, each of units 12, 13, 14 and 15 is actuated counter-clockwise in unison. Arranged about the particular switch units at points in the circumference of circles concentric with the rotatable shaft are twelve studs, extending radially from each of which is a contact. Certain of these contacts will engage certain arcuate segments of the switch in each of the segment's possible positions. Certain other contacts will engage the arcuate segments only in a particular position. Reference to switch unit 12 will illustrate the general manner of operation for all switch units. Switch unit 12 has three arcuate segments 20, 21 and 22. Each of the arcuate segments has a projection such as 37. In the position shown, which is the first position for the switch, a contact connected to stud 1 of the twelve switch studs associated with unit switch 12, engages projection 37 and a circuit is established through segment 20 to the contact associated with stud 4. In the description to follow the contact associated with each of the twelve studs associated with a particular switch unit will be designated by the number of the stud. For the first position of switch unit 12, its contact 5 will engage projection 38 and a circuit is established from contact 5 through segment 21 to contact 8. Similarly another circuit is established from contact 9 through projections 39 and segment 22 to contact 12. Three corresponding circuits are established simultaneously through the corresponding circuits of each of switch units 13, 14 and 15. When switch 11 is rotated counter-clockwise to the second of its three positions each one of the nine projections on the nine arcuate segments of the three switch units will disengage from the contact with which it is shown in engagement on the drawing and will engage with the next higher numbered contact in each instance. Thus projections 37, 38 and 39 will disengage from contacts 1, 5 and 9 respectively, and will engage contacts 2, 6 and 10 respectively. Contacts 4, 8 and 12 respectively, however, will remain in engagement with segments 20, 21 and 22 respectively. Under this condition contacts 2, 6 and 10 will be connected through segments 20, 21 and 22 respectively, to contacts 4, 8 and 12 respectively. No connections are made to certain switch unit studs, as to studs 2, 3 and 4 for instance, of switch unit 15. When the switch units engage such studs, it should be obvious that no circuit is established through the corresponding segment for that particular position. It may be mentioned in passing that each of switch units 16 to 19 of local switch 15 has but two arcuate segments. The operation of the switch, however, should be apparent from the foregoing. Attention is called particularly to segment 42 of switch unit 19. From the wiring of the studs associated with switch unit 19, it should be apparent that no circuit is established through segment 42 until switch unit 19 of local switch 15 has been rotated counter-clockwise into its fifth or final position, at which time projection 59 will engage its contact 11 to provide a circuit through segment 42 to contact 12.

Before proceeding with the detailed description of the circuit the operation of the line current coarse adjustment switch 60 will be explained. Line current coarse adjustment switch 60 has only one switch unit. The one switch unit has two arcuate segments 61 and 62. Segment 61 has a projection 63. Segment 62 has a projection 64 which subtends a larger angle than the normal projection such as projection 63. The switch unit is shown in its first position which is the extreme clockwise position. The switch unit is manually operable and is rotatable counter-clockwise from its position as shown on the drawing to succeeding positions. Attention is called to the fact that when switch 60 is in its first position, as shown on the drawing, no circuit is established through either segment. Attention is also called to the fact that contacts 1 and 6 are both long contacts and remain in engagement with segments 61 and 62 respectively, when switch 60 is rotated counter-clockwise into all of the succeeding switch positions.

When switch 60 is actuated counter-clockwise to position 2, a circuit will be established from contact 7 through projection 63 and segment 61 to contact 6. Since no conductor is connected to stud 2 no operating circuit will be established from contact 1 through segment 62 from contact 2. When switch 60 is actuated to position 3 a circuit is established from contact 8 through projection 63, segment 61 and contact 6. Another circuit is established from contact 1 through segment 64 to contact 3. When switch 60 is actuated clockwise to its fourth position a circuit is extended from contact 9 through projection 63 and segment 61 to contact 6. At the same time the circuit heretofore traced from contact 1 to contact 3 will be maintained, while switch 60 is in its fourth position. Coarse line current adjustment switch 60, as its name implies, is used in adjusting the line current in coarse steps when the circuit is being adjusted for service on the various line options. Switch 60 is supplemental by fine line current adjustment switch 78 which may be, as indicated in Fig. 1, an ordinary resistance divisible into sections 75 and 76 by means of a sliding arm 77. Switch 78 is also manually adjustable. The manner in which switches 11, 15, 60 and 78 function in the circuit will become clear from the description hereinafter.

*Power supply*

It is pointed out that the circuit described herein may function with a wide variety of power services. It is contemplated that under certain circumstances power will be supplied in the field from a gas engine driven generator. The power circuit is arranged so that it may be connected directly to a 115-volt or 230-volt alternating current supply, or to a 115-volt direct current supply, as a regular procedure.

The power circuit is shown in the lower left-hand corner of Fig. 1. Voltage from the power service is impressed across conductors 212 and 213 through filter 206 comprising series inductance and shunt capacitance. The condensers 209 and 210 are connected across conductors 212 and 213. The inner plates of the condensers are connected together and to ground 209. Inductance 207 is connected in series with conductor 212 and a corresponding inductance 208 is connected in series with conductor 213. One side of the power supply circuit may be traced from conductor 212 through inductance 207, contact 159 of switch 154 and conductor 169 which connects to the bottom terminal of the autotransformer 165. The opposite side of the power supply circuit extends from conductor 213, through inductance 208, contact 157 of switch 154 to conductor 170 which connects to the right-hand or fixed terminal of switch 168. The left-hand terminal of switch 168 is shown connected to stud 167 which connects to the lower of the two alternate input terminals of autotransformer 165. Switch 168 is set in this position when power is supplied from a 115-volt alternating current supply. When 230-volt alternating current is impressed across conductors 212 and 213, switch 168 is operated to engage terminal 166 which connects to the upper of the two alternate input terminals on autotransformer 165. Various terminals on the output side of autotransformer 165 are connected by means of taps to various studs arranged in a semicircle on switch 171 which studs are arranged to be engaged by rotatable switch arm 172. From the center point of switch 172 the circuit extends through fuse 173, upper terminal of the primary winding 176 of transformer 174 through the primary winding 176 to the bottom terminal of autotransformer 165. The secondary 175 of transformer 174 has various terminals connected by means of taps to various studs arranged in a semicircle on switch 182. The studs are engaged by rotatable arm 183 which connects to the left-hand terminal of the full wave rectifier 177. The rectifying units in the rectifier may, for instance, be copper oxide or other units. Rectifier 177 is composed of four arms each having individual rectifier units 178, 179, 180 and 181. The lower terminal of the secondary 175 connects to the right-hand terminal of rectifier 177. The top terminal of rectifier 177 is connected through inductance 184, conductor 188, contact 161 of switch 154 through fuse 152 to conductor 150. The bottom terminal of rectifier 177 is connected through conductor 189, contact 163 of switch 154 and fuse 153 to conductor 151. Condensers 185 and 186 are bridged across conductors 188 and 189 to provide a filtering action which reduces the ripple. Resistance 187 serves as an artificial load and assists in voltage regulation. The polarity of the circuit is fixed so that negative battery is supplied to the various apparatus units in the repeater circuit from conductor 150 and positive battery is supplied from conductor 151. Switches 171 and 182 provide means for regulating the voltage impressed on the output of the power circuit. Switch 171 adjusts in fine steps and switch 182 in coarse steps.

When the power service is supplied from a 115-volt alternating current source, power is supplied to the motor which drives the printer over a circuit one side of which may be traced from conductor 212 through inductance 207, conductor 190 and through inductance 193 of filter 192 to one terminal of the motor. The opposite side of this path may be traced from conductor 213 through inductance 208, contact 157 of switch 154, switch arm 168, stud 167, contact 155 of switch 154, conductor 191 and inductance 194 of filter 192 to the printer motor. When the power service is supplied from a 230-volt alternating current source and switch arm of switch 168 engages stud 166, the path extends through the upper of the two input terminals of autotransformer 165 through the lower turns of the transformer to the lower of the two input terminals of autotransformer 165 to stud 167. From this point the circuit follows a path heretofore traced.

When the power service is direct current, switch 154 is operated to its alternate position. For this condition the 115-volt direct current supply is connected directly to conductors 150 and 151 in the following manner: From conductor 212 through inductance 207 through contacts 160 and 162 of switch 154 in series and fuse 152 to conductor 150. The other side of this circuit may be traced from conductor 213 through inductance 208, contacts 158 and 164 of switch 154 in series and through fuse 153 to conductor 151. Under this condition 115-volt direct current is supplied to the printer motor over a circuit which extends from conductor 212 through inductance 207, conductor 190 and inductance 193 to one side of the motor. The opposite side of the motor is supplied from conductor 213 through inductance 208, contact 156 of switch 154, conductor 191 and inductance 194.

Figure 6:
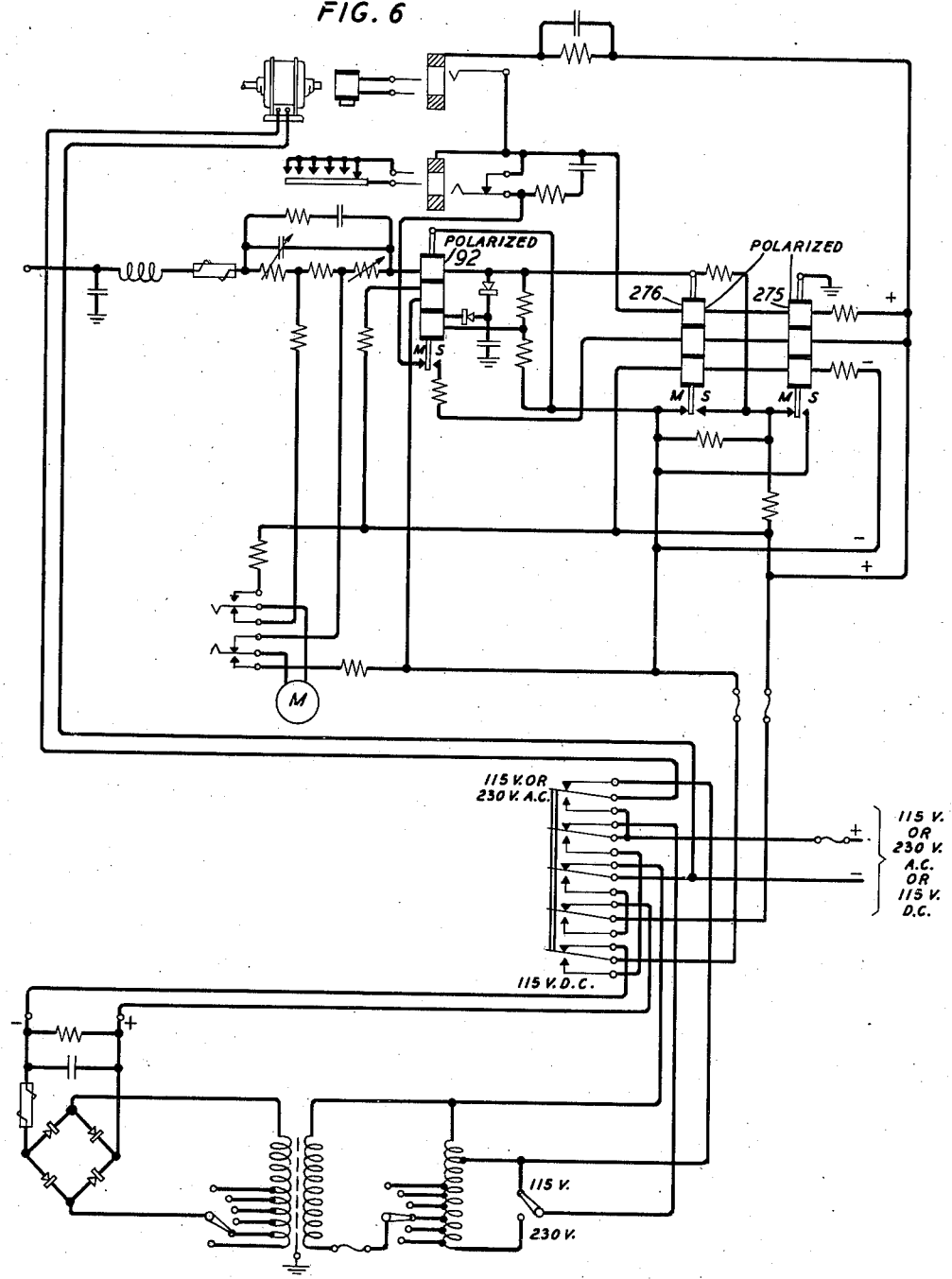
Fig. 6 is a simplified schematic showing the repeater and power circuit with the line side of the repeater per Figs. 1 and 2 arranged for polarential, polar sending and the local side connected to a printer.

Fig. 6 shows the manner in which power from an alternating current source is furnished to a teletypewriter motor as well as to a repeater arranged in accordance with one of the options herein. The power circuit connections may be understood from the foregoing description. The internal connections from the power supply to the repeater and of the repeater will be described in detail below for each particular option.

*General*

It is particularly pointed out that, because of the complexity introduced into the circuit of the repeater herein, due to the provision of the numerous options, first the paths constituting the branches of the circuits for each of the various options in Figs. 1 and 2 will be traced under separate headings and thereafter the operation of the circuit for each of the options will be described with reference to individual simplified figures corresponding to each option under another individual heading for each option.

CIRCUIT FOR LINE SIDE OF REPEATER OPERATING POLARENTIAL, POLAR SENDING

The first line option which will be described is that for the line side of the repeater operating polarential, polar sending. In order to arrange the circuit per Figs. 1 and 2 to function for this condition, it is necessary to establish a circuit in Figs. 1 and 2 which corresponds to the arrangement shown in Fig. 3. How this is performed will now be explained.

For this condition line 1, which connects to terminal 3 in the upper left-hand corner of the drawing, is used and line 2, which connects to terminal 4, is not used. Line 1 connects to a distant polarential repeater arranged for polar receiving. Such repeaters are well known in the art and are described in the patent to Cramer mentioned above. For this option switches 11 and 15 are both in position 1 which is the position in which both are shown in the drawing. It was mentioned above that line 2 is not used on this option. Line 2 is, therefore, open for this condition. This may be seen by tracing the circuit which extends from terminal 4 through line 2, inductance 68 of filter 65 and conductor 108 which connects to terminal 11 of unit 12 of switch 11. Terminal 11 is open as projection 39 is in the condition indicated in the drawing.

As the various branches of the circuits are traced it may be desirable to refer to the corresponding branch in the electrically equivalent figure. In this case comparison would be made with corresponding branches in Fig. 3. It is pointed out that the paths may not pass through windings on the relays located in the same physical position in each instance and there may not be exact correspondence in other minor particulars, but the circuits functionally are exactly the same. The individual separated figures will be used in explaining the operation for the various options hereinafter.

The circuit from line 1 is closed. This circuit may be traced from terminal 3 through line 1, inductance 67, inductance 71, conductor 102, variable resistance 79, resistance 85, conductor 110, variable resistance 76, switch arm 77, conductor 105, contact 9 of unit 12, projection 39, segment 22, contact 12, conductor 222, winding 92a of the receiving polar relay 92, conductor 220, contact 4 of unit 12, segment 20, projection 37, contact 1, conductor 199, conductor 200, conductor 227 which extends into Fig. 2, and conductor 331 which connects to the armature of sending polar relay 276. A first branch extends from line 1, through the protector blocks to ground. A second branch extends from line 1 through filter condenser 69 to ground 70. A third branch extends through resistance 72 and condenser 73 to terminal 1 of switch 60 and to the top terminal of variable resistance 78 in parallel by way of conductor 104. A fourth branch extends through condenser 74 which may be cut into the circuit when switch 60 is in various positions. Variable resistance 79 is divisible into three units which may be connected into the circuit in various manners for various positions of switch 60 which should be understood from the foregoing. When switch 60 is in its fourth position all three resistance units 79A, 79B and 79C are short-circuited. Milliammeter 214 is connected across resistance 85 over a circuit which may be traced from the top terminal of resistance 85, conductor 112, resistance 83, contact 88 of key 86, milliammeter 214, contact 89 of key 86 and conductor 113 to the bottom terminal of resistance 85. Another branch circuit extends from conductor 200, rectifier 96, rectifier 95, winding 92c of relay 92, conductor 128, contact 8 of switch unit 15, segment 30, projection 50, contact 5, conductor 122, resistance 120, conductor 121, conductor 136 and conductor 216 which connects to negative battery supplied through conductor 150. From the junction between rectifiers 95 and 96 a circuit may be traced through condenser 97, conductor 142, conductor 145, contact 5 of unit 14, projection 47, segment 27, contact 8 and conductor 215 which connects to ground. A circuit may be traced through the biasing winding 92b of relay 92 which extends from negative battery supplied through conductor 150, conductor 216, conductor 133, contact 8 of unit 13, segment 24, projection 44, contact 5, resistance 134, conductor 129, resistance 125, conductor 225, winding 92b of relay 92, conductor 130, contact 4 of switch unit 14, segment 26, projection 46, contact 1, conductor 123, conductor 115 and conductor 151 which connects to positive battery. There is another branch circuit which may be traced from conductor 199 at the top right of Fig. 1, through conductor 223, contact 8 of unit 12, segment 21, projection 38, contact 5, conductor 116 and resistance 119 to the left-hand terminal of resistance 120. Still another branch path may be traced from terminal 5 of unit 12 through resistance 102, terminal 9 of unit 13, projection 45, segment 25, contact 12, conductor 202, which extends into Fig. 2, to conductors 335 and 333 in parallel. Contact 335 connects to open spacing contact 277 of relay 276 and conductor 333, connects to closed marking contact 274 of relay 275. The armature of relay 275 is connected over a path through conductor 144, which extends into Fig. 1, contact 12 of unit 15, segment 31, projection 51 and contact 9 to ground. Positive battery is connected to contact 274 of relay 275 and to contact 277 of relay 276. The circuit may be traced from positive battery in Fig. 1 through conductor 151 which extends into Fig. 2, conductor 256, resistance 365 and conductors 333 and 335 in parallel to contacts 274 and 277. Negative battery is connected to contact 273 of relay 275 and to contact 278 of relay 276. The circuit extends from conductor 150 in Fig. 1, through conductor 217 which extends into Fig. 2, conductor 257 and conductor 374 to terminal 273 of relay 275 and to contact 278 of relay 276. Contact 273 of relay 275 and contact 278 of relay 276 are connected to contact 277 of relay 276 and to contact 274 of relay 275 respectively, over a path which may be traced from contact 273 and contact 278, through conductor 375 through resistance 272, conductor 204 which extends into Fig. 1, contact 9 of unit 13, projection 45, segment 25, contact 12 and conductor 202, which extends into Fig. 2, where it connects to contacts 274 and 277 through conductors 335 and 333.

It is particularly pointed out that in a number of the local option arrangements to be described hereinafter the line side of the repeater will be assumed to be in the condition traced under this heading and the battery connections to the contacts of relays 275 and 276 will be the same as traced herein. This is the condition which obtains when the line switch is in position 1 for polarential operation with polar sending. The manner in which the circuit functions when arranged in this condition and for each of the other optional conditions will be explained hereinafter after the circuits are first traced for all options.

It is once more particularly pointed out that in order for the reader to understand the arrangement of the circuit per Figs. 1 and 2 obtained as a result of each one of the optional adjustments, it will probably be necessary to refer to the corresponding individual circuit per Figs. 3 to 14 herein.

CIRCUIT FOR LINE SIDE OF REPEATER OPERATING POLARENTIAL, DIFFERENTIAL SENDING

The circuit for the line side of the repeater operating polarential, differential sending, will now be traced. Comparison may be made with the circuit per Fig. 4 which is functionally identical.

For this condition line 1 is used and line 2 is not used. The line switch 11 is operated to its second position. In this position, as may be understood from the foregoing, each of the projections on each of the three segments of each of the four switch units is disengaged from the contact with which it is in engagement, as shown on the drawing, and it is rotated clockwise to engage the next higher numbered contact in each instance. Local switch 15 will be assumed to remain in its first position as shown on the drawing.

Refer now to Figs. 1 and 2. A circuit may be traced from terminal 3 through line 1, inductance 67, inductance 71, conductor 102, conductor 107, terminal 10 of unit 12 of switch 11, projection 39, segment 22, contact 12, conductor 222, relay winding 92a, conductor 220, terminal 4 of switch unit 12, segment 20, projection 1, contact 2, conductor 199, conductor 200, conductor 227, which extends into Fig. 2, and conductor 331 which connects to the armature of relay 276. From this circuit just traced, branches extend through the protector blocks and through condenser 69 to ground in each instance. A circuit may be traced from conductor 200 through rectifiers 96 and 95 in series, relay winding 92c, conductor 128, contact 8 of switch unit 15, segment 30, projection 50, contact 6 and conductor 127 which reconnects also to conductor 200. From conductor 199 a circuit may also be traced through conductor 223, contact 8 of switch unit 12, segment 21, projection 38, contact 6, conductor 224, conductor 225, relay winding 92b, conductor 130, contact 4 of switch unit 14, segment 26, projection 46, contact 2 and conductor 143 which connects to the junction between the top terminal of rectifier 95 and the right-hand terminal of relay winding 92c. A branch may also be traced from the junction between rectifiers 95 and 96 through condenser 97, conductor 142, conductor 146, resistance 147, contact 10 of unit 15, projection 51, segment 31, contact 12 and conductor 144, which extends into Fig. 2 and connects to the armature of relay 275.

Positive battery is connected to terminal 274 of relay 275 and terminal 277 of relay 276. The circuit may be traced through conductors 333 and 335 in parallel to conductor 202 which extends into Fig. 1, through contact 12 of unit 13, segment 25, projection 45, contact 10, conductor 115 and conductor 151 to positive battery. Contact 273 of relay 275 and contact 278 of relay 276 are connected in parallel and through conductors 375, 257 and 217, which extends into Fig. 1, to conductor 150 which connects to negative battery. For this condition, however, ground is connected to this side of the power supply circuit over a path which may be traced from conductor 150 through conductor 216 in Fig. 1, conductor 133, contact 8 of unit 13, segment 24, projection 44 and contact 6 and ground.

CIRCUIT FOR LINE SIDE OF REPEATER OPERATING TWO-PATH POLAR

The circuit for the line side of the repeater operating two-path polar will now be traced. Comparison may be made with the circuit per Fig. 5 which is functionally the same.

Figure 5:
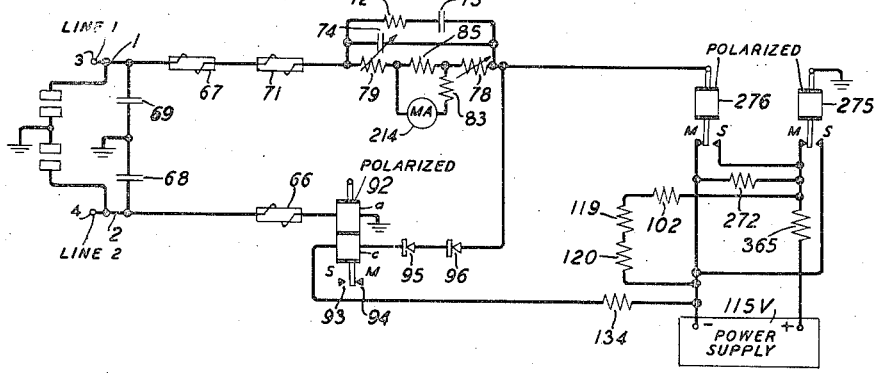
Fig. 5 is a simplified schematic showing the line side of the repeater per Figs. 1 and 2 operating two-path polar.

For this condition, lines 1 and 2 are both used. The line switch 11 is operated to its third position. Local switch 15 remains in its first position as shown on the drawing. A circuit may be traced from terminal 3 through line 1, inductance 67, inductance 71, conductor 102, conductor 107, variable resistances 79a, 79b and 79c, resistance 85, conductor 110, variable resistance 78, sliding arm 77, conductor 105, contact 7 of unit 12, projection 38, segment 21, contact 8, conductor 223, conductor 200, conductor 227, which extends into Fig. 2, and conductor 331 which connects to the armature of relay 276. Branches extend from this path through the protector blocks and condenser 69 to ground as heretofore traced. Branches also extend through resistance 72 and condenser 73 in series and through condenser 74, shunting resistances 79, 85 and 78 as indicated in Fig. 5. Milliammeter 214 is connected across resistance 85. These paths have heretofore been traced. A circuit may also be traced from terminal 4 through line 2, inductance 66, conductor 108, contact 11 of unit 12, projection 39, segment 22, contact 12, conductor 222, relay winding 92a, conductor 220, contact 4 of unit 12, segment 20, projection 37 and contact 3 to ground 91. A branch may also be traced from conductor 200 through rectifiers 96 and 95 in series, relay winding 92c, conductor 128, contact 8 of unit 15, segment 30, projection 50, contact 7, conductor 139, conductor 132, resistance 134, contact 7 of unit 13, projection 44, segment 24, contact 8, conductor 133 and conductor 216 to conductor 150 which connects to negative battery. Another branch of the circuit may be traced from the junction between conductors 133 and 216 through conductor 121, resistances 120 and 119, conductor 116, resistance 102, contact 11 of unit 13, projection 45, segment 25, contact 12 and conductor 202, which extend into Fig. 2, to conductors 333 and 335 in parallel which connect to contact 274 of relay 275, and contact 277 of relay 276, respectively. Contact 274 of relay 275 and contact 277 of relay 276 connect through conductors 333 and 335 in parallel through resistance 365 and conductor 256 to conductor 151 which connects to positive battery. Contact 273 of relay 275 and contact 278 of relay 276 are interconnected by conductor 373 which connects through 375 to conductor 374 and through conductors 257 and 217 to conductor 150 which connects to negative battery. A circuit may also be traced from contact 278 of relay 276 and contact 273 of relay 275 which are interconnected through conductors 373, 375 through resistance 272, conductor 204, which extends into Fig. 1, contact 11 of switch unit 13, projection 45, segment 25, contact 12, conductor 202, which extends into Fig. 2, to conductors 333 and 335 in parallel which connect to contact 274 of relay 275 and contact 277 of relay 276, respectively.

CIRCUIT FOR LOCAL SIDE OF REPEATER OPERATING WITH PRINTER

The circuit for the local side of the repeater operating with a printer will now be traced. Comparison may be made with the circuit per Fig. 7 which is functionally the same. The line side of the repeater may be arranged in any of a number of conditions. It will be assumed, however, that the line side is arranged for polarential, polar sending. For this condition, the line switch 11 will be in position 1. To arrange the local side of the repeater for connection to the local printer, the local switch 15 will also be in position 1. Both switches 11 and 15 will, therefore, be in the conditions shown on the drawing.

Line 1 only is used for this condition, as heretofore explained, and the circuit for the line side of the repeater, including the battery connections to the contacts of relays 275 and 276 are the same as heretofore traced for the polarential polar sending condition and will not, therefore, be retraced.

On the local side of the repeater no external connections to contacts 8, 9 and 10 are required. The plugs of the receiving printer magnet and of the printer transmitter are inserted in their respective jacks. Contact 292 is opened.

A circuit may be traced from positive battery through conductor 151, conductor 246, conductor 248, conductor 250, conductor 251, projection 57, segment 40, contact 12, conductor 259, resistance 342, which is shunted by condenser 343, inductance 307, sleeve 302 of the receiving magnet jack, sleeve of the receiving magnet plug, winding of the receiving magnet, tip of the receiving magnet plug, tip 303 of the receiving magnet jack, conductor 344, conductor 345, sleeve 290 of the printer transmitter jack, sleeve of the printer transmitter plug, printer transmitting contacts, tip of printer transmitting plug, tip 291 of printer transmitter jack, inductance 294, conductor 330, conductor 327, conductor 328, projection 53 of unit 16, segment 33, contact 12, conductor 201, which extends into Fig. 1, marking contact 94 and armature of receiving relay 92, conductor 108, conductor 226 which extends into Fig. 2, contact 6 of unit 16, segment 32, projection 52, contact 1, conductor 358, conductor 354, conductor 257, conductor 217 which extends into Fig. 1, and conductor 150 which connects to negative battery. From the sleeve of jack 290 a circuit also extends through inductance 295, conductor 340, conductor 334, conductor 350, contact 1 of unit 17, projection 54, segment 34, contact 6, conductor 352, relay winding 276a, conductor 356, relay winding 275a, conductor 324, contact 6 of unit 19, segment 41, projection 58, contact 1 and resistance 249 which joins conductor 248 from which point the circuit has been traced to positive battery. A circuit may also be traced from positive battery through conductor 151 which extends into Fig. 2, conductor 256, relay winding 276c, conductor 355, relay winding 275c, conductor 258, contact 6 of unit 18, segment 36, projection 56, contact 1, resistance 233, resistance 234, resistance 235, conductor 242, conductor 217, which extends into Fig. 1, and conductor 150 to negative battery.

A circuit may also be traced from open space contact 93 of relay 92 in Fig. 1 through resistance 126, conductor 131, conductor 203, which extends into Fig. 2, contact 7 of unit 17, projection 55, segment 35, contact 12, conductor 351, relay winding 276b, conductor 357, relay winding 275b and conductor 341 to conductor 259 which connects over a path heretofore traced to positive battery.

CIRCUIT FOR LOCAL SIDE OF REPEATER OPERATING WITH SWITCHBOARD

The circuit for the local side of the repeater operating with a switchboard will now be traced. Comparison may be made with the circuit per Fig. 8 which is functionally the same. It will once more be assumed that the line side of the repeater is connected so as to operate polarential with polar sending. For this condition, as described heretofore, line 1 is used and line 2 is not used. Line switch 11 remains in position 1. The local switch 15 is in position 2 but the local terminal 8 shown at the lower right of Fig. 2 is connected externally to terminal 804 of a switchboard as indicated in Fig. 8. The connections from terminal 3 for line 1 are the same as heretofore traced to the armature of relay 276. The positive and negative battery connections to the contacts of relays 275 and 276 are also the same as heretofore traced. Reference to Fig. 8 shows that in the switchboard a connection is made to negative 115-volt battery from which point a circuit is traced through the winding of west relay 891, make contact of east relay 892, sliding contact of variable resistance 893, switchboard terminal 894 and external conductor 895 which extends to local terminal 8 as shown in Fig. 2 through inductance 308, conductor 260 and conductor 348 to the junction between resistance 329 and 346. It is pointed out that local terminal 8 and the switchboard terminal 804 may be separated by a distance not exceeding five miles. The circuit which extends through resistance 329 continues through contact 8 of unit 16, projection 53, segment 33, contact 12, conductor 201 which extends into Fig. 1, marking contact 94 of relay 92, conductor 198, conductor 226, which extends into Fig. 2, contact 6 of switch unit 16, segment 32, projection 52 and contact 2 to ground. The path which extends through resistance 346 continues through contact 2 of unit 17, projection 54, segment 34, contact 6, conductor 352, relay winding 276a, conductor 356, relay winding 275a, conductor 324, contact 6 of unit 19, segment 41, projection 58, contact 2 and conductor 141, which extends into Fig. 1 and connects to the junction between contact 94 of relay 92 and conductor 201. A circuit may also be traced from the open contact 93 of relay 92 through resistance 128, conductor 131, conductor 118, contact 1 of unit 13, projection 43, segment 23, contact 4, conductor 117, which extends into Fig. 2, contact 8 of unit 18, projection 57, segment 40, contact 12, conductor 259, conductor 341, relay winding 275b, conductor 357, relay winding 276b, conductor 351, contact 12 of unit 17, segment 35, projection 55, contact 8, conductor 205, which extends into Fig. 1, contact 12 of unit 14, segment 28, projection 48, contact 9, conductor 216 and conductor 150 to negative battery.

For this option a biasing circuit is also established which extends through biasing winding 275c and 276c. This circuit is the same as was traced through the same windings for the condition where the local side of the repeater is connected to a printer under the last preceding heading. Comparison may be made between Fig. 7 and Fig. 8 which show that the biasing circuits are the same.

CIRCUITS FOR LOCAL SIDE OF REPEATER OPERATING WITH LINE UNIT

The circuit for the local side of the repeater operating with a line unit will now be traced. Comparison may be made with the circuit per Fig. 9 which is functionally the same. For this condition it will be assumed that the line side of the repeater is operating polarential, polar sending. The line switch will, therefore, be in position 1. The local switch is in position 2. The condition within the repeater circuit per Fig. 1 and Fig. 2 is, therefore, identical with that described under the last preceding heading wherein the local side of the repeater was connected to a switchboard. The internal connections of the repeater, therefore, remain unchanged and are the same as shown in Fig. 8. Local terminal 8, however, instead of being connected to a switchboard is connected as shown in Fig. 9 to a line unit. The circuit may be traced from negative 115-volt battery through transmitting terminals 901, winding of receiving relay 902, variable resistance 903, terminal 904 on the line unit and through external conductor 905 to local terminal 8 shown in Fig. 2.

CIRCUIT FOR LOCAL SIDE OF REPEATER OPERATING WITH PRINTER STATION EQUIPPED WITH A LINE RELAY

The circuit for the local side of the repeater operating with a printer equipped with a line relay will now be traced. See Fig. 10. For this condition, also, the internal connections of the repeater per Fig. 1 and Fig. 2 are the same as described under the last two preceding headings. Local terminal 8, however, is connected to a printer station for this condition. At the printer station a power supply 1012 is connected to a rectifier 1011. From the negative terminal of the rectifier a circuit extends through conductor 1014, conductor 1015, conductor 1016, sending printer contacts 1001, top winding of polar receiving relay 1002, variable resistance 1025, through terminal 1026 of the printer station and external conductor or line 1027 to local terminal 8 of Fig. 2. A second branch extends from negative battery through conductors 1014 and 1018, resistance 1009, bottom winding of relay 1002, resistance 1004, conductor 1019 and conductor 1020 to the positive terminal of rectifier 1011 which is connected to ground 1010. A circuit may also be traced from the negative terminal of the rectifier through conductor 1015, conductor 1017, resistance 1003, armature of relay 1002, contact 1021, resistance 1008, resistance 1007, winding of receiving magnet 1013, conductor 1019 and conductor 1020 to the positive side of rectifier 1011. From open contact 1022 of relay 1002 a circuit may be traced through resistances 1006 and 1005 which connects also through conductor 1019 and conductor 1020 to the grounded positive side of rectifier 1011.

CIRCUIT FOR THE LOCAL SIDE OF THE REPEATER OPERATING WITH A CARRIER TELEGRAPH TERMINAL

Figure 11:
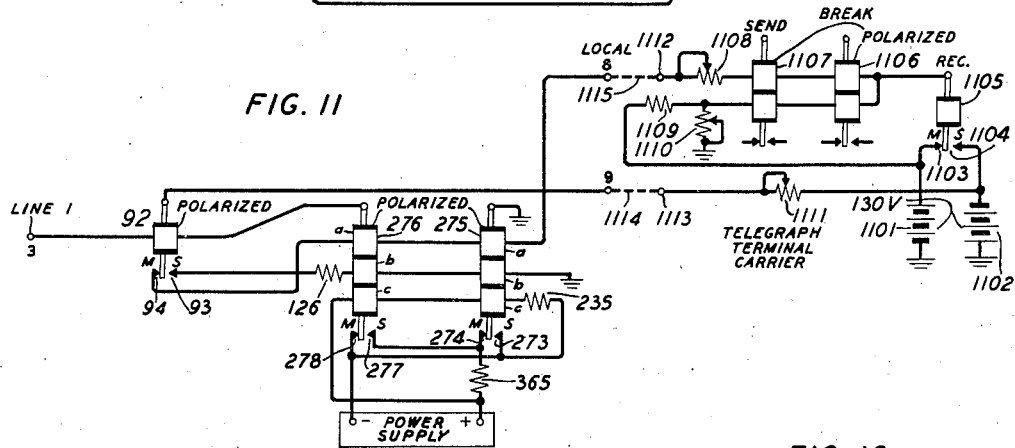
Fig. 11 is a simplified schematic showing the local side of the repeater per Figs. 1 and 2 operating with a carrier telegraph terminal.

The circuit for the local side of the repeater operating with a carrier telegraph terminal will now be traced. Comparison may be made with the circuit per Fig. 11 which is functionally the same. It will again be assumed that the line side of the repeater is connected for polarential, polar sending operation in accordance with Fig. 3 herein. The line switch will be in position 1. The local switch is operated to position 3. Local terminals 8 and 9 in the lower right-hand portion of Fig. 2 are connected externally as shown in Fig. 11 by means of conductors or lines 1115 and 1114 to the carrier telegraph terminal. The carrier telegraph terminal with which the repeater herein cooperates is well known in the art as the CF2 or CF2B carrier telegraph terminal manufactured by the Western Electric Company, Incorporated. It is described in the "Bell Laboratories Record" for May 1944, volume XXII, Number IX, pages 404 to 408, published by the Bell Telephone Laboratories, Incorporated. The circuit to which the repeater herein connects is shown on Fig. 3 on page 406 thereof. The sending and receiving relays of that figure correspond to relays 1107 and 1105 respectively of Fig. 11 herein. The loop is modified as shown in Fig. 11 herein.

Refer now to Fig. 11. A circuit may be traced from positive battery 1101 at the telegraph carrier terminal through contact 1103 and the armature of the receiving relay 1105 through the top winding of break relay 1106 and the top winding of sending relay 1107 through variable resistance 1108, terminal 1112 and external conductor or line 1115 to local terminal 8 in Fig. 2. A branch of this circuit extends from a junction between the armature of the receiving relay and the top winding of relay 1106 through the bottom winding of relay 1106, bottom winding of relay 1107 and resistance 1109 to positive battery 1101. Between the bottom winding of relay 1107 and resistance 1109, a variable resistance 1110 is connected to ground. A circuit may also be traced from negative battery 1102 through variable resistance 1111, terminal 1113 and external conductor or line 1114 to local terminal 9 in Fig. 2. Reference is now made to Fig. 1 and Fig. 2. From local terminal 8 a circuit extends through inductance 308, conductor 260, terminal 3 of unit 19, projection 58, segment 41, terminal 6, conductor 324, relay winding 275a, conductor 356, relay winding 276a, terminal 9 of unit 16, projection 53, segment 33, contact 12, conductor 201, which extends into Fig. 1, terminal 94 and armature of relay 92, conductor 198, conductor 226, which extends into Fig. 2, terminal 6 of unit 16, segment 32, projection 52, contact 3, conductor 325, conductor 261 and inductance 313 to terminal 9 from which point the circuit was traced to negative battery 1102 at the telegraph carrier terminal. A circuit may also be traced from the open contact 93 of relay 92 through resistance 126, conductor 203, which extends into Fig. 2, contact 9 of unit 17, projection 55, segment 35, contact 12, conductor 351, relay winding 276b, conductor 357, relay winding 275b, conductor 341, conductor 259, contact 12 of unit 18, segment 40, projection 57 and contact 9 to ground. The connection to line 1 and the connections from positive and negative battery to the contacts of relays 275 and 276 are as previously described for Fig. 3 above.

CIRCUIT FOR THE LOCAL SIDE OF TWO REPEATERS PROVIDING INTERMEDIATE OPERATION WITH A PRINTER

Figure 12:
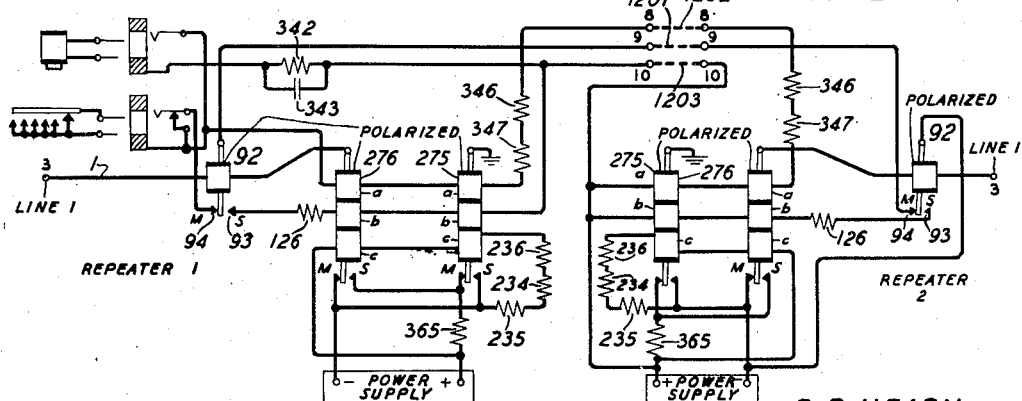
Fig. 12 is a simplified schematic showing the local side of two repeaters per Figs. 1 and 2 arranged to function as an intermediate repeater with a local printer connected at the intermediate point.

The circuit for the local side of two repeaters per the invention herein interconnected to provide operation at an intermediate point on a line and having a printer connected at the intermediate point will now be traced. Comparison may be made with the circuit per Fig. 12 which is functionally the same. It will again be assumed that the line side of each of the two repeaters is connected for polarential operation with polar sending as in Fig. 3 herein. In order to arrange the circuits for this option, it is necessary to have two repeaters such as that of combined Fig. 1 and Fig. 2 herein, having their local sides interconnected as shown in Fig. 12. The local switch of the repeater to which the printer is connected must be operated to position 4 and the local switch of the second repeater to which it is interconnected must be operated to position 5. The local binding posts 8, 9 and 10 of one repeater are interconnected by means of three external conductors to the local binding posts 8, 9 and 10 respectively, of the cooperating repeater. The circuit corresponding to the right-hand repeater shown in Fig. 12 will first be traced in Figs. 1 and 2. Attention is particularly called to the fact that the local switch for this condition is in position 5. A circuit may be traced from terminal 8 through inductance 308, conductor 260, conductor 348, resistances 346 and 347 in series, terminal 5 of unit 17, projection 54, segment 34, terminal 6, conductor 352, relay winding 276a, conductor 356, relay winding 275a, conductor 324, terminal 6 of unit 19, segment 41, projection 58, contact 5, conductor 248, conductor 250, conductor 252, conductor 253, contact 11 of unit 19, projection 59, segment 42, contact 12, conductor 255 and inductance 314 to local terminal 10. A circuit may also be traced from local terminal 9 through inductance 313, conductor 261, conductor 326, contact 11 of unit 16, projection 53, segment 33, contact 12, and conductor 201, which extends into Fig. 1, contact 94 and armature of relay 92, conductor 198, conductor 226, which extends into Fig. 2, contact 6 of unit 16, segment 32, projection 52, contact 5, conductors 353, 354, conductor 257, conductor 217, which extends into Fig. 1, and conductor 150 to negative battery. A circuit may also be traced from the open contact 93 of relay 92 through resistance 126, conductor 131, conductor 203, which extends into Fig. 2, contact 11 of unit 17, projection 55, segment 35, contact 12, conductor 351, relay winding 276b, conductor 357, relay winding 275b, conductor 341, conductor 259, contact 12 of unit 18, segment 40, projection 57, contact 11, conductor 253, contact 11 of unit 19, projection 59, contact 12, conductor 255 and inductance 314 to local terminal 10. A branch of the circuit last traced extends from conductor 253 through conductors 252, 250, 248, 246 and 151 to positive battery. A circuit may also be traced from negative battery in Fig. 1 through conductor 150, conductor 217, which extends into Fig. 2, resistances 235, 234 and 236, contact 5 of unit 18, projection 56, segment 36, contact 6, conductor 258, relay winding 275c, conductor 355, relay winding 276c, conductor 256 and conductor 151 which extends to positive battery in Fig. 1. The connection to line 1 and the positive and negative battery connections to the contacts of relays 275 and 276 are the same as previously traced.

Now the circuit for the left-hand repeater of Fig. 12 will be traced. As explained in the foregoing, a second repeater such as Fig. 1 and Fig. 2 is required. Since the printer is to be connected to the left-hand repeater, the local switch of the repeater will be operated to position 4. The line switch, as explained above, is maintained in position 1.

A circuit may be traced from local terminal 8 through inductance 308, conductor 260, conductor 348, resistance 346, resistance 347, terminal 4 of unit 19, projection 58, segment 41, contact 6, conductor 324, relay winding 275a, conductor 356, relay winding 276a, conductor 352, contact 6 of unit 17, segment 34, projection 54, contact 4, conductor 350, conductor 334, conductor 340, inductance 295, sleeve 290 of the printer transmitter jack, sleeve of the printer transmitter plug, printer transmitting contacts, tip of printer transmitter plug, tip 291 of printer transmitter jack, inductance 294, conductor 330, conductor 327, contact 10 of unit 16, projection 53, segment 33, contact 12, conductor 201, which extends into Fig. 1, contact 94 and armature of relay 92, conductor 198, conductor 226, which extends into Fig. 2, contact 6 of unit 16, segment 32, projection 52, contact 4, conductor 325, conductor 261 and inductance 313 to local terminal 9. A circuit may also be traced from terminal 10 through inductance 314, conductor 255, conductor 254, contact 10 of unit 18, projection 57, segment 40, contact 12, conductor 259, resistance 342, which is shunted by condenser 343, inductance 307, sleeve 302 of the receiving magnet jack, sleeve of the receiving magnet plug, winding of receiving magnet, tip of receiving magnet plug, tip 303 of receiving magnet jack, conductor 344, and conductor 345 which joins the path last traced at jack sleeve 290. A circuit may also be traced from the open contact 93 of relay 92 through resistance 126, conductor 131, conductor 203, which extends into Fig. 2, contact 10 of unit 17, projection 55, segment 35, contact 12, conductor 351, relay winding 276b, conductor 357, relay winding 275b and conductor 341 which connects to the left-hand terminals of resistance 342 and condenser 343. From this point the circuit has been traced to local terminal 10. Another circuit may be traced from negative battery in Fig. 1 through conductors 150 and 217 which extend into Fig. 2 through resistances 235, 234 and 236 to terminal 4 of unit 18, projection 56, segment 36, contact 6, conductor 258, relay winding 275c, conductor 355, relay winding 276c, conductor 256 and conductor 151 to positive battery.

CIRCUIT FOR LOCAL OPERATION WITH ELECTRONIC REGENERATIVE REPEATER

The circuit for the local side of the repeater herein connected to an electronic regenerative repeater will now be traced. The electronic regenerative repeater with which the repeater herein cooperates for this option is disclosed in copending application, Serial No. 556,352, R. B. Hearn, J. A. Krecek, filed September 29, 1944, which is incorporated herein by reference as though fully set forth herein.

Figure 13:
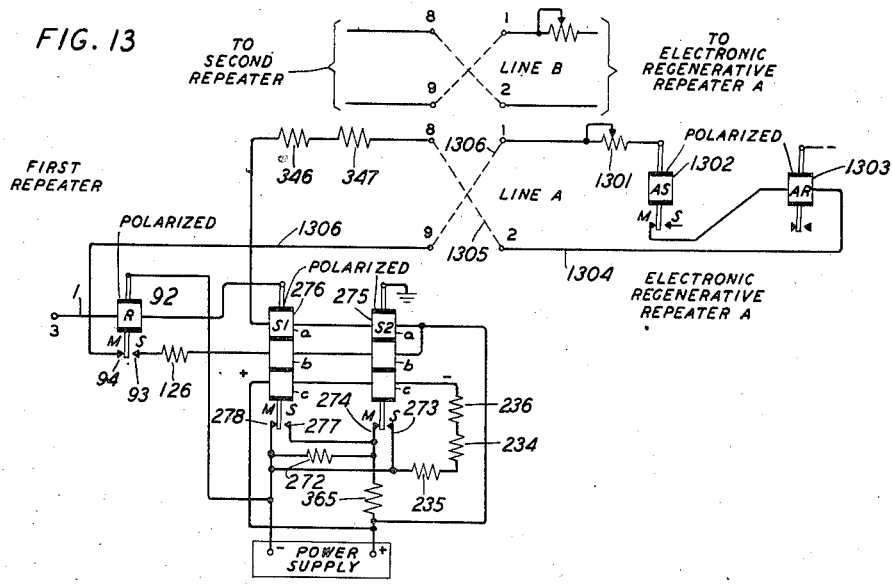
Fig. 13 is a simplified schematic showing the repeater per Figs. 1 and 2 cooperating with an electronic regenerative repeater, the two combined to serve as an intermediate repeater.

Comparison may be made with the circuit per Fig. 13 which is functionally the same. It is again assumed that line 1 only is used and that it is arranged for polarential operation with polar sending. For this condition, the line switch is in position 1. The local switch is operated to position 5. The internal connections of the repeater per Fig. 1 and Fig. 2 for this option are the same as described above for the right-hand repeater in Fig. 12 except that the connection from terminal 10 to relay winding 275a is not used. Local terminal 8 and local terminal 9 of the repeater per Fig. 2 herein are connected to a pair of terminals for a particular line such as line A in the electronic regenerative repeater. It is particularly pointed out that the electronic regenerative repeater is arranged to serve two repeaters such as the repeater per combined Fig. 1 and Fig. 2 herein, simultaneously. Reference to Fig. 13 indicates the manner in which other repeaters may be connected to the single electronic regenerative repeater. The circuit in the electronic regenerative repeater extends from a particular terminal 1 associated with a particular line through variable resistance 1301, the armature and marking contact of relay 1302, winding of relay 1303 and conductor 1304 to the corresponding line terminal 2 from which point it is connected by means of conductor 1305 to local terminal 8 of the repeater herein. Terminal 1 is connected to local terminal 9 of the repeater herein by means of external conductor 1306. Relays 1302 and 1303 of Fig. 13 herein correspond to relays 13 and 14 of Fig. 1 of the application, per Serial No. 556,352 mentioned above. The corresponding relays to which the second repeater would be connected are relays 33 and 34 of the electronic regenerative repeater. Connections from positive and negative battery to the marking and spacing contacts of relays 275 and 276 are the same as have been traced heretofore.

CIRCUIT FOR MANUAL TELEGRAPH SET OPERATION

The circuit for manual telegraph set operation of the repeater herein will now be traced. Comparison may be made with the circuit per Fig. 14 which is functionally the same. For this condition, it will be again assumed that line 1 only is used and that it is arranged for polarential operation with polar sending. The local switch is operated to position 1. The printer transmitter plug and the printer receiver plug are disconnected from their corresponding jacks. The plug associated with head set 289 is inserted in the head set jack closing the normally open contact 285.

For this condition, a circuit may be traced from the head set 289 at the upper right of Fig. 2, through sleeve 288 of the associated plug, sleeve 282 of the head set jack, condenser 283, conductor 340, inductance 295, conductor 345, contact 301 of manual telegraph key 300, closed contact 292 of the printer transmitter jack, inductance 294, conductor 330, conductor 327, conductor 328, contact 7 of unit 16, projection 53, segment 33, contact 12, conductor 201, which extends into Fig. 1, contact 94 and armature of relay 92, conductor 198, conductor 226, which extends into Fig. 2, contact 6 of unit 16, segment 32, projection 52, contact 1, conductor 358, conductor 354, conductor 257, conductor 217, which extends into Fig. 1, and conductor 150 to negative battery. From the opposite terminal of the head set 289 a circuit may be traced through the tip 287 of the head set plug, tip 286 of the head set jack, resistance 281, variable resistance 280, conductor 361, conductor 375, which connects in parallel to open spacing contact 273 of relay 275, and marking contact 278 of relay 276, through contact 278 and armature of relay 276, conductor 331, conductor 227, which extends into Fig. 1, conductor 200, conductor 199, contact 1 of unit 12, projection 37, segment 20, contact 4, conductor 220, relay winding 92a, conductor 222, contact 12 of unit 12, segment 22, projection 39, contact 9, conductor 105, variable resistance 73, conductor 110, resistance 85, conductor 111, variable resistance 79, conductor 107, conductor 102, inductances 71 and 67 and conductor 1 to terminal 3 associated with line 1. Another circuit extends from the tip conductor of the head set jack through closed make contact 285, and neon lamp 284, to the left-hand terminal of condenser 283. A circuit may also be traced from positive battery in Fig. 1 through conductor 151, which extends into Fig. 2, conductor 246, conductor 248, resistance 249, contact 1 of unit 19, projection 58, segment 41, contact 6 of unit 19, conductor 324, relay winding 275a, conductor 356, relay winding 276a, conductor 352, contact 6 of unit 17, segment 34, projection 54, contact 1, conductor 350 and conductor 334 to the left-hand terminal of condenser 283.

The contacts of key 300 are shunted by condenser 299.

Positive and negative battery are connected to the marking and spacing contacts of relays 275 and 276 as heretofore traced.

Radio suppression filters 293, 306 and 312 which have inductance in series with the printer leads and external conductor leads 8, 9 and 10 and capacitance shunted between the leads and ground suppress radio frequency currents generated in the repeater from being radiated by the leads to the printer and other external connections.

INTRODUCTORY DESCRIPTION OF THEORETICAL OPERATION OF LINE SIDE OF REPEATER

*Introductory description of polarential operation*

Although polarential operation is well known in the art, and may be understood from reference to the Cramer patent mentioned above, it will be described in a general way preliminary to a description of the operation of the polarential line options of the present repeater. It is particularly pointed out that the polarential circuits for the Cramer patent and of the explanatory Figure 15 herein have been modified in accordance with the invention herein to permit their application to lines of longer span than has heretofore been possible.

Fundamentally, a circuit operating on a polarential basis uses polar transmission in one direction and differential transmission in the other direction. These two terms have been combined to form the word "polarential." Fig. 15 is a theoretical schematic of polarential operation. In a polar transmission system, the marking and spacing line currents transmitted from one station are of the same magnitude and flow in opposite directions and hence, the receiving relay at the other station, operates on reversals of line current and requires no local bias circuit. In a differential transmission system, the marking and spacing line currents are in the same direction but different in magnitude and this difference as applied to the polarential method of operation requires a spacing current about 2½ times the marking current. Since the spacing current is in the same direction as the marking current a repeater receiving marking and spacing currents flowing in the same direction requires a local biasing circuit on the receiving relay. By fixing this local biasing circuit in a marking direction at half the sum of the received marking and spacing line currents, and poling the line winding of the receiving relay spacing, the net effect on the armature of the receiving relay is equivalent to polar transmission. To get this equivalent of polar transmission in both directions on one telegraph channel, the opposite ends of a polarential circuit are made dissimilar as regards the connections of the sending and receiving relay circuits and the operating voltages applied to the line. One end of the circuit applies negative and positive polarity of the same value while sending for the marking and spacing conditions respectively and this is known as the polar sending end of the circuit. The other end of the circuit applies ground for marking and positive polarity for spacing and is known as the differential sending end of the circuit. For the transmission of a spacing signal from the differential sending end the positive battery at the differential sending end is in series with negative battery connected normally to the line, at the polar end. Thus the magnitude of the voltage is approximately 2½ times the value of the negative battery at the polar end. Assuming a direction of flow of current from positive to negative it will be observed that in transmitting from the differential sending end the direction of the flow of current for marking signals is from the differential end to the opposite end. For the transmission of a spacing signal from the differential end to the opposite end the direction of the flow of current is the same as that for the marking signal but the magnitude of the current for the spacing signal is greater.

Reference to Fig. 15 shows the arrangement of a type B polarential line for a particular embodiment. In Fig. 15 the polar sending station is at the left. Batteries of equal potential and opposite polarity, positive and negative 75 volts, are connected to the line through the operation of relay 1501 for transmission from the polar sending end. At the opposite end of the circuit the armature of sending relay 1504 is connected to ground. For the transmission from the differential sending end ground is connected to the line for marking and the current is assumed to flow from ground to negative battery at the distant end. When relay 1504 is operated for a spacing signal, positive 115-volt battery is connected to the polarential end of the line in series with negative battery at the distant end. The sum of the battery voltage is about 2½ times the voltage impressed on the line for the marking condition.

For transmission from the polar transmitting end, Fig. 15A represents the magnitude of the marking and spacing signals received from relay 1501 by relay 1503 for dry and wet conditions. For a dry line the magnitude of the currents for marking and spacing are greatest and they are of course equal.

The magnitudes of the receiving marking and spacing currents are decreased for different degrees of wetness but they remain equal and unbiased signals are received by relay 1503. No biasing winding is required therefore on receiving relay 1503.

For transmission from the differential transmitting end, Fig. 15B represents the magnitudes of the current received by relay 1502 from relay 1504. It indicates that the magnitude of the marking and spacing signals are affected equally for different degrees of wetness. The magnitude of the spacing current is greatest and the magnitude of the marking current is least for the dry condition. The magnitude of the marking current is decreased by the same amount that the magnitude of the spacing current is increased for wet conditions. The biasing current in the receiving relay 1502 is fixed at half the sum of the marking and spacing currents for the dry condition. As the values of the current received by relay 1502 change for different degrees of wetness the difference between the biasing current and the marking and spacing currents remains equal one to another.

Thus for values of 46 milliamperes marking current and 18 milliamperes spacing current obtained for the dry condition for the voltage employed in the particular embodiment of Fig. 15 and for a particular line impedance, the biasing current may be permanently established at 32 milliamperes and the received signals will be effectively polar signals not withstanding changes in current magnitudes due to varying leakance for different degrees of wetness.

*Introductory description of two-path polar operation*

Refer now to Figs. 16, 16A and 16B which show the theoretical operation of the line side of the circuit for the two-path polar line option. This system of operation is also well known in the art. It is particularly pointed out that in the present invention the theoretical two-path polar system has been modified in a manner to be described hereinafter.

In two-path polar operation a separate channel is required for transmitting in each direction. Reference to Fig. 16 shows that voltages of equal magnitudes, in this embodiment 75 volts, and of opposite polarities are impressed on the line at the transmitting end for marking and spacing signals. Fig 16A indicates that, when the transmission is from relay 1601, relay 1602 receives signal currents of equal magnitudes for marking and spacing whether the line is wet or dry.

When transmission is in the opposite direction, or from relay 1603 to relay 1604, over the second channel, the signals received by relay 1604 are, of course, the same as shown in Fig. 16A for the opposite direction since the voltages are the same.

Effect of long spans

Reference to Fig. 15 shows that there is a receiving relay having a winding in series with the single line at each terminal. If the line has a high capacity to ground the receiving relays are affected by a phenomenon well known in the art as "kick off." By this is meant the false operation of the receiving relay due to current surges caused by the discharge of the line capacity back through the winding of the receiving relay when the transmitting relay at the same station is sending.

The longer the line the greater its total capacity and the greater the magnitude of the current surge through the winding of the receiving relay. The repeater of the invention herein is designed to function on 50 to 75-mile lines of high capacity. This is considerably longer than the spans on which direct current repeaters subject to kick off effect have heretofore been satisfactorily operated. Various anti-kick off features are presently known in the art but none of the presently known arrangements is effective to prevent kick off on lines having spans of such length as those on which it is contemplated the present repeater will be applied. The anti-kick off feature of the present invention makes possible the effective operation of direct current repeaters such as those shown in Fig. 15 on spans up to 75 miles in length as a normal procedure and under favorable conditions where the distributed capacity is less it is effective on spans of considerably greater length. This is important particularly in military service, where, due to many well understood circumstances, satisfactory operation on lines of long span is of paramount importance.

DETAILED DESCRIPTION OF OPERATION OF REPEATER

Repeater line circuit operation—General

In the case of polarential, polar sending, and two path polar operation, the transmission branch of the present repeater is arranged for double commutation to permit sending negative and positive battery from a single non-grounded power supply. Two sending relays 275 and 276 in Figs. 1 and 2 are needed for this type of transmitting branch. The reversal of polarity takes place across a potentiometer circuit comprising resistances 272 and 365 which in the present embodiment provides 75 volts for marking and 75 volts for spacing in polarential polar sending and two-path polar transmission.

The protector blocks serve to protect the equipment from surges inducted into the line by lightning or nearby power lines. Filter 65 is a radio suppression filter. Retard coil 71 is a telephone noise killer coil.

Line side of repeater operating polarential, polar sending

Figure 3:
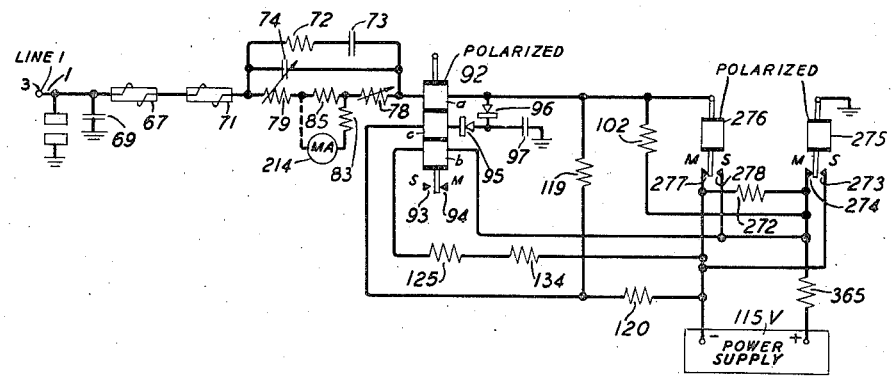
Fig. 3 is a simplified circuit schematic showing the line side of the repeater per Figs. 1 and 2 operating polarential, polar sending.

Refer to Fig. 3.

The adjust line current course switch 60 in Fig. 1 controls series resistance and shunted capacity to provide wave shaping and at the same time an approximate adjustment of the line current. The final value of line current is obtained by turning the adjust line current fine potentiometer 78.

The circuit is shown in the marking condition. The armatures of relays $S_1$ and $S_2$ are operated, either to the right or left, in unison under control of a circuit assumed to be connected to the right-hand side of the repeater. The line 1 is terminated at the distant office in a repeater arranged as per Fig. 4 for differential sending. The circuit is arranged for half duplex operation, that is, communication is possible in only one direction or the other at a particular time. At the distant end, Fig. 4, line 1 is terminated in ground. The line circuit per Fig. 3 has been traced in the foregoing from terminal 3 to the armature of relay 276. When in the idle or marking condition the armatures or relays 275 and 276 are both actuated to the left, under the influence of the local side of the circuit, to engage with their marking contacts as shown. The two resistances 365 and 272 are connected across the positive and negative terminals of the 115-volt power circuit so as to cut down the voltage connected to the line in this embodiment to 75 volts. The operation of relays 275 and 276 in unison reverses the ground connection to one side or other of the output circuit of the power supply so as to change the polarity while maintaining the voltage constant at 75 volts. Thus, for the marking condition indicated, ground is connected to the junction between resistances 272 and 365 and a circuit may be traced from ground through the armature and left-hand contact 274 of relay 275, resistance 272 and the armature and left-hand contact 277 of relay 276, connecting negative 75-volt battery to the path which has been traced through the top winding of receiving relay 92 through conductor 1 to terminal 3, from which point it extends through a line to a polarential repeater arranged as in Fig. 4 herein, to ground connected to the marking contact of a relay corresponding to relay 276 in Fig. 4. For the spacing condition, the armatures of relays 275 and 276 are operated to their right-hand contacts. For this condition ground is connected to the negative terminal of the power circuit and the circuit may be traced from ground through the armature and right-hand or spacing contact 273 of relay 275. The positive side of the power supply may be traced through resistance 365, resistance 272 to spacing contact 278 of relay 276. This connects positive 75-volt battery in this embodiment to the line.

The circuit through line winding 92a for the marking condition for signaling over the circuit is in such a direction as to tend to operate the armature of relay 92 in Fig. 3 to engage with its spacing contact 94. The effect of the current in the biasing winding 92b, which remains fixed in direction, tends to operate the armature of relay 92 to its marking contact and this latter effect is greater than the opposite effect of the line winding. The armature of receiving relay 92 is, therefore, maintained in engagement with its marking contact.

When a spacing signal is transmitted from the polar sending end, the direction of the current in line winding 92a is changed so that the effect augments the effect of the bias current in the winding 92b and the armature of relay 92 is held more firmly to its marking contact.

The rectifier units 95 and 96, which may for instance be selenium or other rectifier units, together with condenser 97 and winding 92c constitute an anti-kick off circuit. The rectifier unit 96 is poled so that it does not pass current due to the negative 75-volt potential impressed on the line for the marking condition. Rectifier unit 95 is so poled that it passes current when condenser 97 is charged positively with respect to ground. While this current is flowing, its direction is such that its effect assists in holding the armature of relay 92 on its marking contact.

During the marking interval line 1 is negatively charged. After the transmission of the marking signal, when the line is connected to positive battery for the transmission of a spacing signal, the line which was negatively charged discharges through winding 92a but its direction is now such as to tend to maintain the armature of relay 92 on its marking contact. When a spacing signal is transmitted, however, the line is positively charged. Rectifier units 95 and 96 pass the current from positive battery in series through winding 92c. Condenser 97 is charged to positive 75 volts. The direction of the current from positive battery is from right to left through winding 92b and its effect is such that it tends to maintain the armature of relay 92 in its marking contact. When the armatures of relays 275 and 276 return to their spacing contacts the positively charged line discharges through winding 92a in a direction from left to right. This time the effect of the discharge current tends to operate the armature of relay 92 to its spacing contact. However, condenser 97 discharges through winding 92c to the junction of resistances 119 and 120 and maintains the armature of relay 92 on its marking contact. When condenser 97 starts to discharge it has 75 volts positive potential impressed across it and it discharges to 115 volts negative potential through resistances 119 and 120 connected in parallel. Condenser 97 cannot discharge through rectifier 96 because its polarity now opposes such discharge. The effect of the varistor 95 is to prevent the large capacity 97 from appearing across the winding 92c and acting as a shunt which would cause relay 92 to be too sluggish to follow the line signal accurately. The arrangement of the anti-kick off circuit and the values of the constants of the apparatus units make possible a current of relatively large value for a sufficient period through winding 92c to compensate for the effect of a heavy discharge from a relatively long span. With such an arrangement it is possible to use longer spans than heretofore possible without kick off.

Figure 4:
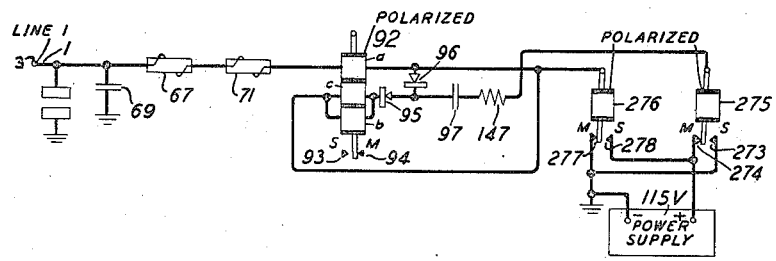
Fig. 4 is a simplified schematic showing the line side of the repeater per Figs. 1 and 2 operating type B polarential, differential sending.

In receiving apparatus signals from the distant terminal arranged in accordance with Fig. 4, the receiving line current is increased. This overcomes the effect of the biasing current in winding 92b which was holding the armature of relay 92 on its marking contact. The biasing current is, as explained formerly, equal to half the sum of the combined marking and spacing currents. While the magnitude of the received marking and spacing currents varies due to weather conditions, the marking current is increased by the same amount that the spacing current is decreased. The biasing current supplied from the local source remains unchanged. The effect of the signaling is therefore the same as though polar signals are being received.

Attention is particularly called to the fact that since the armatures of relays 275 and 276 in Fig. 3 remain in engagement with their marking contacts while signals are being received from the distant end and since the polarity of the received marking and spacing signals remains unchanged, the anti-kick off circuit remains substantially in the same condition as for the transmission of a marking signal from the polar transmitting end.

*Line side of repeater operating polarential, differential sending*

Refer to Fig. 4.

The operation of the line side of the repeater arranged for polarential differential sending will now be explained. Attention is called to the fact, as shown in Fig. 4, that the line switches for adjusting the line current are not included in the circuit for this condition. Since Fig. 4 connects to a Fig. 3 at the distant station the line current is adjusted by the switches in Fig. 3.

The circuit per Fig. 4 is shown in the marking condition. For this condition the line is connected to ground at the armature of relay 276. The effect of the line current in winding 92a for the marking condition maintains its armature in engagement with its marking contact. When the polarity of the current at the distant terminal per Fig. 3 is changed the armature of relay 92 is operated to its spacing contact.

When transmitting from Fig. 4 to Fig. 3 it has been explained that the direction of the current remains the same for both marking and spacing signals while its magnitude is increased for spacing. This holds the armature of relay 92 more firmly on its marking contact when a spacing signal is transmitted from Fig. 4 to Fig. 3.

In the arrangement per Fig. 4 rectifiers 95 and 96, condenser 97, resistance 147 and windings 92b and 92c constitute an anti-kick off circuit. This circuit is necessarily arranged differently from that that described for Fig. 3 since the polarity and magnitude of the potentials applied to the line for the signaling conditions are different from those in Fig. 3. The function of the anti-kick off circuit, however, is the same; namely, to prevent the kick off of the receiving relay 92 on current surges from the lines of very long span.

The manner in which the anti-kick off circuit of Fig. 4 functions will now be explained.

For the marking condition shown, ground is connected through contact 277 and the armature of relay 276 to parallel branches. One branch extends through rectifier 96 to the left-hand terminal of condenser 97. A second branch extends through rectifier 96, rectifier 95, and windings 92b and 92c in parallel. The right-hand terminal of the condenser 97 is connected through resistance 147 and the armature and contact 274 of relay 275 to positive 115-volt battery. Since the line 1 in Fig. 4 is connected to ground for this condition, the line is charged from negative 75-volt battery at the distant end. Any discharge through winding 92a from the line on transition to positive 115-volt battery for spacing is relatively small and tends to maintain the armature of relay 92 on its marking contact.

For the spacing condition positive 115-volt battery is connected through contact 278 to the line and through rectifier 96 to condenser 97. The right-hand terminal of condenser 97 is connected through resistance 147 to the armature of relay 275, thence through contact 273 to ground. No current flows through winding 95b and 95c as the return path is to +115 volt. This represents a swing of 230 volts on the terminals of condenser 97 since it is charged to positive +115 volts and discharges to the negative side of the 115-volt rectifier. The line 1 is charged positively by the 115-volt potential. For the reason previously mentioned there is no flow of current in windings 92b and 92c until the armatures of relays 275 and 276 return to their marking contacts. At this time the positively charged line discharges through winding 92a in a direction to operate its armature towards its spacing contact. The anti-kick off circuit prevents this, however, for when the armatures of relays 275 and 276 reengage their respective marking contacts positive 115-volt battery is again connected to the right-hand terminal of condenser 97. The left-hand terminal, of the condenser is at positive 115 volts also due to the charging during the spacing interval. There is, therefore, approximately 230 volts applied across windings 92b and 92c in parallel. This provides a high current to prevent kick off. The constants of the apparatus units of the circuit are chosen so that the high current persists during the interval while the line 1 is discharging. The effect of the flow of the current through the 92b and 92c windings in parallel from right to left is to maintain the armature of relay 92 in engagement with its marking contact.

It is particularly pointed out that on transmission from Fig. 4 to Fig. 3 although the direction of the flow of current is the same for both marking and spacing signals and the effect of both the steady state marking and spacing currents is to maintain the armature of relay 92 on its marking contact, before the steady state condition becomes effective, immediately after a transition from a spacing to a marking signal, a very heavy surge of current passes through winding 92a in Fig. 4 in a direction to operation the armature of relay 92 to spacing. The anti-kick off circuit of this invention is effective to prevent this notwithstanding the magnitude of the kick off effect due to the long span.

*Line side of repeater operating two-path polar*

The operation of the repeater herein when the line side of the repeater is arranged for the two-path polar option will now be described.

Refer to Fig. 5.

The circuit per Fig. 5 is assumed to be connected by means of two conductors to a distant repeater such as Fig. 5. Line 1 is connected at the distant end to line 2 or the receiving side of the repeater, thence through the winding of receiving relay such as 92. Line 2 is connected at the distant terminal to line 1 or to the sending end of the circuit through a termination such as is connected to line 1 in Fig. 5. Attention is called to the fact that the line current adjusting apparatus appears in the sending line only at each station. Therefore, the line current for each line is adjusted by means of the adjusting apparatus associated with the sending end of each line.

The power connections to the contacts of relays 275 and 276 are through resistances 365 and 272 as heretofore described to provide, for the present embodiment, negative 75-volt and positive 75-volt potentials for marking and spacing respectively upon the operation of relays S1 and S2. At the distant end the armature of the receiving relay such as 92 is held in engagement with its marking contact by the effect of negative battery connected to line 1 in Fig. 5 for marking. The armature of the distant relay 92 is actuated to its spacing contact when positive 75-volt battery is connected to the line in Fig. 5. The second line operates in the same manner in the opposite direction. Attention is called to the fact that there is but one receiving relay in each line for this option. There is no kick off problem when the line is thus arranged. Attention is called also to the fact that notwithstanding there is no kick off problem the rectifiers 95 and 96 are effectively connected in the circuit although the condenser 97 is disconnected. The rectifiers 95 and 96 perform another function when the circuit is arranged for two path polar operation. The rectifiers provide a holding circuit and a break feature for this option. When the armatures of relays 275 and 276 are on their respective marking contacts, no current flows through the lower winding of relay 92 in Fig. 5. When the armatures of relays 275 and 276 are on their spacing contacts, current from positive battery flows through rectifiers 96 and 95, bottom winding of relay 92 in Fig. 5 and through resistance 134 to negative battery. The effect of this current is to maintain the armature of relay 92 in engagement with its marking contact when signals are being sent from the repeater. Thus it can be seen that a break signal from the distant repeater can be received only when the repeater is marking.

REPEATER LOCAL CIRCUIT OPERATION

*General*

It is particularly pointed out that for each repeater, such as Figs. 1 and 2, an individual rectifier is required. The relays such as 275 and 276 when operated ground one side or the other of the rectifier. Therefore, one rectifier cannot serve more than one repeater.

*Local side of repeater operating with printer*

Fig. 6 is a complete functional schematic, showing the repeater and rectifier power circuit with the line side of the repeater arranged for polarential polar sending and the local side connected to a printer. Both the line and local switches in Fig. 1 and Fig. 2 are in position 1 for this condition. The line side for this condition corresponds to the arrangement in Fig. 3 and its operation has been explained in the foregoing. The local side of the repeater corresponds to the arrangement in Fig. 7 and its operation will now be explained.

Refer to Fig. 7. When the printer transmitter and receiver are connected to their respective jacks, and the receiving relay 92 is on its marking contact as shown, negative battery is connected through the armature of receiving relay 92 and the contacts of the transmitter through relay windings 276a and 275a and resistance 249 to positive battery, as well as through the winding of the receiving magnet and resistance 342 to positive battery. The effect of the current in the top windings a, of relays 276 and 275 tending to operate their armatures to the left to engage their respective marking contacts is dominant over the effect of the current through their biasing windings 276c and 275c tending to operate the armatures to spacing and the armatures are maintained in engagement with their marking contacts for this condition. The receiving magnet is simultaneously energized. The operation of the transmitting contacts deenergizes windings 276a and 275a and the armatures of relays 276 and 275 are actuated to their spacing contacts under the influence of their biasing windings. Simultaneously the receiving magnet is deenergized to produce a local copy of the message. When receiving relay 92 is actuated to spacing in response to signals incoming from the line, the receiving magnet is also deenergized. The armatures of relays 276 and 275 are held in engagement with their marking contact however, due to the effect of current from negative battery through the armature and spacing contact of relay 92, resistance 126, windings 276b and 275b and resistance 249 to positive battery. The voltage applied to this circuit is the full 115 volts of the power circuit. This hold circuit for relays 276 and 275 provides a communication break feature. If the line is opened at the distant end to transmit a break signal, the armature of the receiving relay 92 remains on its spacing contact and the effect of the current in windings 276b and 275b is dominant so that signals cannot be transmitted from the printer in Fig. 7 while the break signal persists. Resistance 249 limits the current in operating windings 275a and 276a and resistances 233, 234 and 235 limit the current in the biasing windings 275c and 276c to their proper values. Resistor 342 limits the current in the receiving magnet and as shunted by the capacitor 343 constitutes a wave shaper.

Attention is called to the fact that when the repeater is arranged as per Figs. 3 and 7 combined, it functions as a terminal repeater with the printer serving to transmit and receive messages at the terminal through the repeater over a line, which may be of very long span, to a distant telegraph repeater which may be a terminating repeater or at intermediate repeater.

*Local operation with a switchboard*

The repeater herein when its local side is arranged as shown in Fig. 8 may be connected to a manual telegraph switchboard. The switchboard may be of any of a number of types but preferably the switchboard designed for military service by the United States Signal Corps and known in the art as the "BD100 switchboard."

Refer now to Fig. 8. In the idle condition the armatures of the sending relays 275 and 276 are held in engagement with their marking contacts by the effect of current flowing through windings 275a and 276a, which is dominant over the opposing effect of current in biasing windings 275c and 276c. The current in the local circuit between the repeater and the switchboard is furnished from negative 115-volt battery in the switchboard in the present embodiment. The current supplied from the switchboard is adjusted to approximately 60 milliamperes by means of potentiometer 803 and it divides about equally through resistances 329 and 346. When the east relay 802 in the switchboard is released, current is removed from windings 275a and 276a. The current in the biasing windings 275c and 276c becomes effective to actuate the armatures of these relays to spacing and a spacing signal is transmitted through line 1 as heretofore described to the distant station.

On incoming signals the relay of armature 92 is actuated. When the armature of relay 92 is disconnected from its marking contact, west relay 801 in the switchboard is deenergized and a spacing signal is transmitted through the switchboard. When the armature of relay 92 engages its spacing contact, windings 275b and 276b are connected in a circuit between negative 115 volts and ground. The effect of current in this circuit holds the armatures of sending relays 275 and 276 on their marking contacts while signals are being received by relay 92.

*Local operation with line unit*

The repeater herein, when its local side is arranged as shown in Fig. 9, may be connected to what is known in the art as a line unit. The line unit may be any of a number of types but preferably the line unit designed for military service by the United States Signal Corps and known in the art as a "BE77" or "BE77A" line unit. The operating features and local current adjustments are identical with those for the operation with the switchboard described under the preceding heading. The relay in the line unit responds to incoming signals repeated by receiving relay 92 and the sending contacts of the printer connected to the line unit open and close the circuit through windings 275a and 276a of the sending relay to transmit the signals out over the connected line.

*Local operation with a printer equipped with a line relay*

Figure 10:
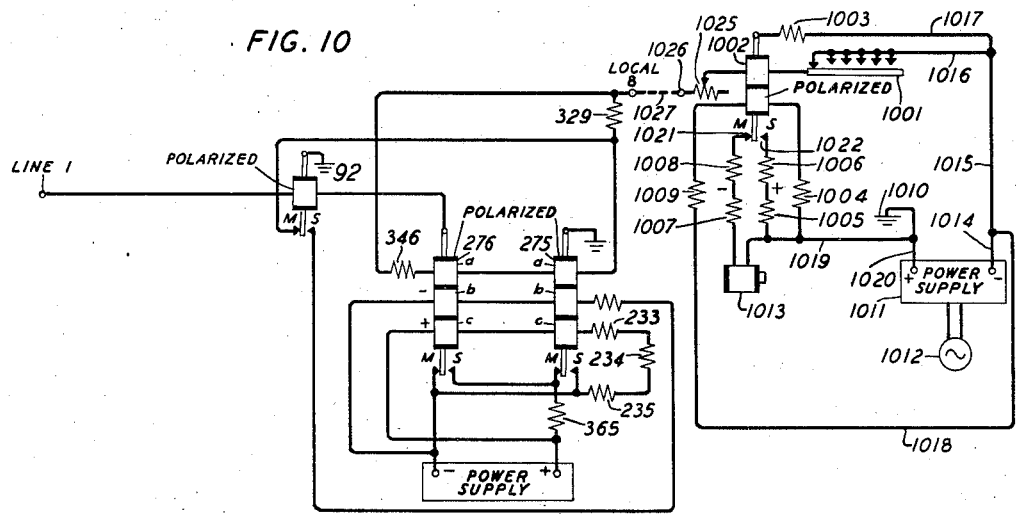
Fig. 10 is a simplified schematic showing the local side of the repeater per Figs. 1 and 2 operating with a printer station.

The repeater herein, when the local side is arranged as shown in Fig. 10, may be connected to a printer equipped with a line relay. Refer to Fig. 10, which shows the local side of the repeater connected to a station in which the repeater is equipped with line relay 1002. The line relay 1002 is provided with a biasing circuit; the biasing current in this embodiment is preferably 30 milliamperes. The printer station is equipped with an adjustable resistance 1025 arranged in series with the conductor interconnecting the printer to the local side of the repeater. The line current is preferably adjusted to 60 milliamperes. The rectifier at the printer station is preferably adjusted to provide 120 volts when the line is closed and the printer magnet is connected. Operation of receiving relay 92 in response to incoming signals from the distant repeater opens and closes the line through the upper winding of relay 1002. When the line is closed the effect of the line current operates the armature of relay 1002 to engage its marking contact 1021 energizing its printer magnet 1003. When the line is open the effect of the current in the lower or biasing winding of relay 1002 actuates the armature of relay 1002 to its spacing contact 1022. When the transmitting contacts of the printer 1001 are opened and closed the armatures of relays 275 and 276 are actuated to transmit signals to the distant repeater. The line relay 1002 associated with the printer responds to signals transmitted from contact 1001 thereby controlling printer magnet 1003 to provide a local copy of the outgoing message.

*Local operation with a carrier telegraph terminal*

The repeater herein, when its local side is arranged as shown in Fig. 11, may be connected to a carrier telegraph terminal. The carrier telegraph terminal may be any of a number of types but preferably a carrier telegraph terminal designed for military service and known in the art as a "CF-2-B" carrier telegraph terminal, manufactured by the Western Electric Company, Incorporated. The local current is preferably adjusted to 60 milliamperes by the potentiometer 1008 at the carrier terminal. In the idle condition, the 60 milliampere local current flows from positive 130-volt battery, connected to marking contact 1103 of receiving relay 1105, through the windings of break relay 1106 and of sending relay 1107 in the carrier equipment, through windings 275a and 276a of the sending relays, through the marking contact 94 of the receiving relay 92 and back through potentiometer 1111 to negative 130 volts in the carrier equipment. Operation of the receiving relay 1105 in the carrier equipment causes the operation of sending relays 275 and 276 which repeat the signals over line 1, to the distant repeater. In the case of signals incoming from the distant repeater, receiving relay 92 opens and closes the local circuit extending through the top windings of send relay 1107 and break relay 1106 in the carrier equipment and relays 1107 and 1106 respond to these signals. The sending relays 275 and 276 are held on their marking contacts when receiving relay 92 is operated to its spacing contact due to the application of negative 130 volts in the carrier equipment through spacing contact 93, resistance 126 and windings 276b and 275b to ground.

*Local operation using two repeaters to provide intermediate operation*

The repeater herein, when its local side is arranged as shown in Fig. 12, may be connected to a second repeater such as the repeater herein and the two combined repeaters serve as an intermediate repeater in a line connecting two distant repeaters. When so arranged a local printer may be connected to one of the repeaters. When the repeaters are interconnected, the local interconnecting circuits are so arranged that no adjustment of the current is required. The printer transmitter and the printer receiver are connected to their respective jacks. In the description to follow the left-hand repeater will be called repeater 1 and the right-and repeater will be caller repeater 2. The circuit per Fig. 12 is shown in the marking condition. For this condition the circuit interconnecting the two repeaters extends from negative battery in repeater 2, preferably 130 volts, through the marking contact 94 of relay 92, conductor 1201, armature of receiving relay 92 in repeater 1, marking contact 94, sending contacts of the printer, winding 276a, winding 275a, resistance 347, resistance 346, conductor 1202, which extends to repeater 2, resistances 346 and 347 in repeater 2 and windings 276a and 275a to positive battery. A branch extends from the circuit last traced from the junction between the printer transmitting contacts and winding 276a in repeater 1. The branch extends through the winding of the printer receiving magnet, resistance 342 and conductor 1203, which extends into repeater 2, to positive battery. In this embodiment current of 30 milliamperes will flow through the windings of the sending relays 275a and 276a in each repeater. Each pair of sending relays in each repeater is provided with an obvious biasing circuit; the current in the biasing winding in this embodiment is approximately 15 milliamperes. The effect of the current flowing in the top or operating windings of the sending relays will be dominant over the opposing effect of the current flowing in the bottom or biasing windings of these relays and the armatures of these relays will be maintained in engagement with their marking contacts as shown in Fig. 12, for this condition. When a spacing signal is received from the distant repeater connected to repeater 1, the armature of relay 92 in repeater 1, will be actuated to engage with its spacing contact 93. This opens the circuit through the top or operating windings of each of the sending relays in each repeater. The armatures of relays 275 and 276 in repeater 2 are actuated by the effect of the current in their biasing windings to engage their spacing contacts. The armatures of relays 275 and 276 in repeater 1 however, will be maintained in engagement with their marking contacts by the effect of current flowing in a circuit which may be traced from negative battery connected to the armature of relay 92 in repeater 2, marking contact 94, conductor 1201, into repeater 1, through the armature of spacing contact 93 of receiving relay 92 in repeater 1, resistance 126, winding 276b, winding 275b and conductor 1203, which extends into repeater 2, to positive battery. The operation of the sending relays 275 and 276 in repeater 2, transmits a spacing signal over the line extending to the distant repeater connected to repeater 2. The operation of the armature of receiving relay 92 in repeater 1 to its spacing contact deenergizes the receiving magnet in the printer. This provides a copy of the message which is being transmitted through the intermediate repeater per Fig. 12 at the intermediate point. When a spacing signal is received from the distant repeater connected to repeater 2, the armature of relay 92 in repeater 2 is actuated to its spacing contact 93. This opens the circuit which has been traced through the operating windings of relays 275 and 276 in both repeater 1 and repeater 2. The armatures of relays 275 and 276 in repeater 1 are actuated to engage their spacing contacts. This transmits a spacing signal to the distant repeater connected to repeater 1. When the armature of relay 92 in repeater 2 engages its spacing contact 93, negative battery is connected through resistance 126, winding 276b and winding 275b to positive battery. This holds the armatures of relays 275 and 276 in repeater 2 on their marking contacts. The winding of the printer magnet is deenergized so that signals are received by the printer connected to repeater 1, in each case, that is, for transmission through the intermediate repeater per Fig. 12 in either direction.

When the printer transmitting contacts are opened and closed, the path through the operating windings of sending relays 275 and 276 in each repeater is energized and deenergized. Signals are therefore transmitted from each repeater over the line connecting each to its respective repeater. The transmission to each distant repeater is simultaneous. The operation of the printer contacts also energizes and deenergizes the printer receiving magnet to provide a local copy.

*Operation of local side of repeater connected regenerative repeater*

The local side of the repeater may be connected to a regenerative repeater, which is preferably an electronic regenerative repeater, when arranged per Fig. 13.

Refer to Fig. 13.

Fig. 13 shows the manner in which the local side of the repeater herein may be connected to a regenerative repeater, which preferably is the regenerative repeater disclosed in the above-identified pending application of Krecek and Hearn. As indicated in Fig. 13 more than one of the present repeaters may be connected to the regenerative repeater.

The current in the loop interconnecting each of the present repeaters to the regenerative repeater may be adjusted to the desired value by means of the potentiometer such as 1301. In the present embodiment the current is adjusted preferably to approximately 30 milliamperes. The loop interconnecting the present repeater to the preferred electronic regenerative repeater extends from negative battery through the armature and marking contact 94 of receiving relay 92 in the present repeater, conductor 1306, potentiometer 1301, armature and marking contact of relay 1302, winding of relay 1303, conductors 1304 and 1305, resistances 347 and 346 and windings 276a and 275a to positive battery. Signals incoming from the distant repeater connected to line 1 actuate the armature of relay 92. When the armature of relay 92 is actuated to its spacing contact the loop circuit is opened and relay 1303 is operated to spacing. Simultaneously the relay 92 establishes a holding circuit through windings 276b and 275b as heretofore described. Relay 1303 impresses the signals on the regenerative repeater. The regenerative repeater retimes and regenerates the signals in a manner fully explained in the above-identified application Serial No. 556,352, which application is a part of the present disclosure. The regenerative repeater retransmits the regenerated and retimed signals through a second repeater such as the present repeater. These signals actuate a relay corresponding to relay 1302 connected to the second repeater. This in turn opens and closes the loop circuit connected to the second repeater operating the relays corresponding to relays 275 and 276 in the second repeater. This in turn transmits the signals over a line such as line 1 to the distant repeater connected to the second repeater.

*Operation of manual telegraph set*

Figure 14:
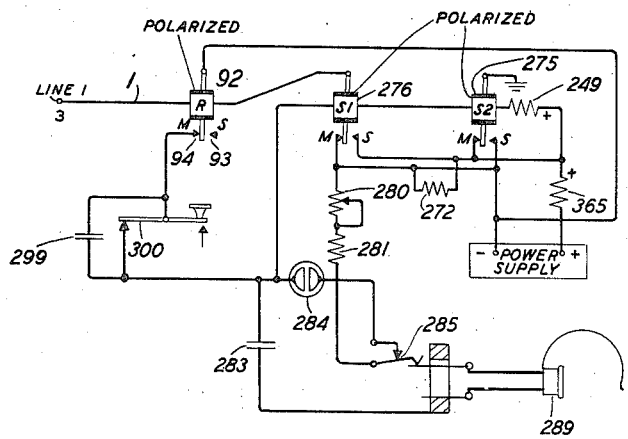
Fig. 14 is a simplified schematic of the manual telegraph set which is part of the repeater per Fig. 1.

The local side of the repeater herein may be arranged for manual telegraph set operation in accordance with Fig. 14.

Refer to Fig. 14.

The incoming line extends through the winding of receiving relay 92 to the armature and marking contact of relay 276 to which negative battery, preferably of 115 volts, is applied and ground through the armature and marking contact of relay 275. For this condition, relay 92 is energized and the armature of relay 92 is held on marking. Negative battery is connected to both terminals of the neon lamp 284 for this condition. The circuits may be traced from negative battery through the armature and marking contact 94 of relay 92 through the closed contacts of the elegraph key to the left-hand terminal of neon lamp 284. The circuit to the opposite terminal of the lamp extends through the jack contact 285, resistance 281, potentiometer 280 thence to negative battery. Shunting the neon lamp 284 are the condenser 283 and the receiver 289 in series. No oscillations occur for this condition. When the telegraph key 300 is operated negative battery is disconnected from the left-hand terminal of neon lamp 284 and the sending relays 275 and 276 operate and transmit a spacing signal over line 1. The positive battery connected through the windings of relays 275 and 276 to the left-hand terminal of neon lamp 284 becomes effective in cooperation with the negative battery which remains connected to the right hand terminal to set up oscillations in the neon lamp circuit. These oscillations may be heard in the headset.

When a spacing signal is received from the distant repeater connected to line 1, receiving relay 92 actuates its armature to its spacing contact. This again disconnects negative battery from the left-hand terminal of neon lamp 284. The positive battery connected to this terminal again becomes effective to set up oscillations in the lamp circuit which may be heard in the receiver.

What is claimed is:

1. In a telegraph system, a telegraph signal receiving relay, a first winding on said relay, a telegraph line connected in series with said winding, a second winding on said relay, two rectifiers connected in series between said first winding and said second winding, and a circuit extending from ground directly through a condenser to the junction between said rectifiers, for preventing kick-off of said relay due to line surges on telegraph signal reversals.

2. In a telegraph system, a telegraph signal receiving relay at a first station, a first winding on said relay, a telegraph line connected in series with said winding, means at said first station for transmitting polar signals through said winding over said line to a distant station, a second winding on said relay, a condenser having a first terminal connected directly to ground, a first rectifier connected from a terminal on said first winding to a second terminal on said condenser, a second rectifier connected from said second terminal to a terminal on said second winding, means for charging said condenser with current of a first polarity through said second rectifier during the marking interval, means for passing current of a second polarity through said rectifiers in series, and simultaneously charging said condenser with current of said second polarity during the spacing interval, and means for discharging said condenser through said second winding at the beginning of the succeeding marking interval to prevent kick-off of said relay due to the discharge of said line through said first winding.

3. In a telegraph system, a telegraph line, a telegraph signal receiving relay, a line winding connected in series with said line and an antikick-off winding both on said relay, two rectifiers and a condenser connected to said windings, means connected to said relay for charging said condenser with current of a particular polarity and to a potential substantially equal to the signaling potential for a particular signaling condition at a first time, and means for discharging said condenser through said antikick-off winding to a source of potential of opposite polarity and of higher value than said signaling potential at a second time to prevent the kick-off of said relay due to the discharge of said line through said line winding.

4. In a telegraph system, a telegraph line, a telegraph signal receiving relay at a first station, an operating winding on said relay in series with said line, an antikick-off winding on said relay, a first and a second rectifier connected in series between said windings, a condenser having a first terminal connected to the junction between said rectifiers and a second terminal connected directly to ground, means at said station for impressing potential of a first polarity and of A volts magnitude on said line for a first signaling interval, means at said station for impressing potential of a second polarity, different from said first polarity, and of A volts magnitude on said line for a second signaling interval, means for charging said condenser through said antikick-off winding and said second rectifier from a source of potential of said first polarity and of greater than A volts in magnitude during said first signaling interval, means for charging said condenser through said first rectifier with said potential of said second polarity and of A volts magnitude during said second signaling interval, and means for discharging said condenser through said antikick-off winding to said source of potential of said first polarity and of greater than A volts in magnitude immediately after a transition from said second to said first signaling condition to prevent kick-off of said relay due to a line surge of relatively great magnitude through said operating winding.

5. In a telegraph system, a telegraph relay having an operating winding such that when connected in a highly capacitative telegraph line causing said relay to be subject to the effect of heavy line surges tending to falsely operate said relay, comprising an antikick-off circuit connected to said relay, said circuit comprising an antikick-off winding, a rectifier and a condenser, means for passing a current of relatively large magnitude through said antikick-off winding to prevent said false operation, said means comprising means for charging said condenser during a first signaling condition from a source of potential of the same magnitude and polarity as is impressed on said line for said condition and comprising also means for discharging said condenser through said antikick-off winding during a second signaling condition to a source of potential of opposite polarity from said charging polarity and of a magnitude greater than the magnitude used in signaling for any signaling condition.

6. In a telegraph system, a relay having a first and a second winding, means for impressing a first potential of a first polarity in a first direction on a telegraph conductor in series with said first winding to charge said conductor at a first time, means for discharging said charge on said conductor through said first winding in a second direction at a second time, a condenser connected to said relay, means for charging said condenser in a first direction by means of said first potential at said first time and means for discharging said condenser in a second direction through said second winding to a potential of opposite polarity from the polarity of said first potential, and of greater magnitude than the magnitude of said first potential, at said second time.

7. In a telegraph system, an antikick-off winding on a relay, a condenser connected to said winding, means for charging said condenser from a source of electromotive force of a first polarity and of a first magnitude at a first time, and means for discharging said condenser through said winding to a source of electromotive force of polarity opposite to said first polarity and of a potential more than 50 per cent greater than said first magnitude at a second time.

8. In a telegraph system, an antikick-off winding on a relay, a condenser connected to said winding, means for charging said condenser at a first time, means for discharging said condenser through said winding at a second time and potential means connected to said condenser and said winding for increasing the effect of said discharge at said second time.

9. In a telegraph system, a universal telegraph repeater, means therein for operating said repeater as the polar sending end of a type B polarential channel at a first time, means therein for operating said repeater as the differential sending end of a type B polarential channel at a second time, first manually operable switching means in said repeater for rapidly adapting said repeater for operation under one or the other of the foregoing conditions at said times and other manually operable switching means for rapidly adjusting the line current to desired value at the start of operation, all of said means cooperating to facilitate the establishing of telegraph operation between two of said repeaters in a minimum of time.

10. A system in accordance with claim 9 including also antikick-off circuits for a telegraph receiving relay, and means in said circuits, responsive to the operation of said first switching means, for adapting said circuits for operation with said repeater arranged either as a polar sending or differential sending terminal.

11. A system in accordance with claim 9 having also a first antikick-off circuit including means for preventing kick-off when said repeater is arranged as a polar sending station, a second antikick-off circuit different from said first antikick-off circuit including means for preventing kick-off when said repeater is arranged as a differential sending station, and means responsive to the operation of said first switching means for arranging said antikick-off circuits for operation when said repeater is arranged for one or the other type of sending.

12. In a telegraph system, a telegraph relay having a winding in series with a telegraph line, said relay being subject to false operation due to discharge of said line through said winding, an antikick-off circuit connected to said relay comprising a condenser and a rectifier, and means for impressing a potential on said circuit substantially equal to twice the maximum potential employed in signaling over said line.

13. In a telegraph system, a telegraph relay having a winding in series with a telegraph line, said relay being subject to false operation due to discharge of said line through said winding, means for connecting ground to a first end of said line for a first telegraph signaling condition, means for connecting a source of potential of A volts in magnitude to said first end of said line for a second telegraph signaling condition, a circuit connected to said relay to prevent said false operation, and means for impressing a potential substantially equal to 2A volts in magnitude on said circuit to prevent said false operation.

14. In a telegraph system, a telegraph line, a differential sending termination of a type B polarential telegraph channel connected to said line, an antikick-off circuit in said termination and means for impressing a potential on said circuit substantially equal to twice the potential applied to said circuit at said termination for the spacing condition to prevent kick-off of the receiving relay in said termination.

15. In a telegraph system, a telegraph line, a polar sending termination of a type B polarential telegraph channel connected to said line, an antikick-off circuit in said termination, and means for impressing a potential on said circuit greater than the sum of the potentials applied to said line at said termination for the marking and spacing signaling conditions to prevent kick-off of the receiving relay in said termination.

16. In a telegraph system, a pair of telegraph channels, a two-path polar termination connected to said channels at a repeater station, a receiving relay and a sending relay in said termination, a holding circuit connected to said receiving relay, a rectifier in said holding circuit poled to pass current of the same polarity as that of the spacing signal current transmitted from said station, and means for transmitting current of said polarity through said circuit when a spacing signal is transmitted from said station to hold said receiving relay in the marking condition.

17. In a telegraph system, a telegraph repeater, a receiving relay and a sending relay in said repeater, an operating winding, a biasing winding and a holding winding on said sending relay, and means for energizing said holding winding through a spacing contact on said receiving relay.

18. In a telegraph system, a telegraph line connected to a first telegraph repeater, a telegraph signal transmission circuit connected to the local side of said repeater, said circuit comprising two conductors arranged to form a loop in said first repeater, a second repeater, said two conductors extending into said second repeater, means for closing said loop for the marking condition, means for opening said loop in response to the reception of a spacing signal from said line by said first repeater, and means for establishing a holding circuit for a transmitting relay in said first repeater, said circuit extending through one of said conductors from a source of potential in said second repeater, in response to the reception of said spacing signal.

19. In a telegraph system, a first and a second telegraph repeater interconnected through local connections to form an intermediate repeater, a receiving relay in each repeater, a loop path extending from a contact on one of said relays directly to a contact on another of said relays and then through a winding of a transmitting relay in each of said interconnected repeaters, when said interconnected repeaters are in one signaling condition, means for opening said loop path at one or the other of said contacts when said interconnected repeaters are in a second signaling condition, and means for establishing a holding circuit for the sending relay in the repeater in which said contact is opened, said path extending through one of the conductors of said opened loop path.

20. In a telegraph system, a telegraph repeater, a magnetic telegraph receiving relay in said repeater, a line winding on said relay, means in said repeater for arranging said repeater for a plurality of different forms of telegraph signal transmission to meet a plurality of different conditions at different times, an antikick-off circuit comprising lumped capacitance and a plurality of unidirectional resistance controls for said capacitance connected to said winding in said repeater, a manually operable switch in said repeater connected to said capacitance and said controls, said switch arranged to change the interconnections betweeen said capacitance, said controls, and said winding, so as to adjust said antikick-off circuit differently for service when said repeater is arranged for said different forms of telegraph transmission.

RICHARD B. HEARN.
CARLETON B. SUTLIFF.

REFERENCES CITED

The following references are of record in the file of this patent:

UNITED STATES PATENTS

| Number | Name | Date |
|---|---|---|
| 2,394,538 | Edgar | Feb. 12, 1946 |